United States Patent [19]
Takahashi et al.

[11] Patent Number: 6,074,020
[45] Date of Patent: Jun. 13, 2000

[54] BRAKING FORCE CONTROL SYSTEM FOR TURNING HAVING CORRECTION PARAMETERS CAPABILITIES AND METHOD THEREOF

[75] Inventors: Akira Takahashi; Yutaka Hiwatashi; Koji Matsuno; Munenori Matsuura, all of Gunma, Japan

[73] Assignee: Fuji Jukogyo Kabushiki Kaisha, Tokyo, Japan

[21] Appl. No.: 08/748,410

[22] Filed: Nov. 13, 1996

[30] Foreign Application Priority Data

Dec. 13, 1995 [JP] Japan ................................. 7-324535

[51] Int. Cl.[7] ....................................................... B60T 8/06
[52] U.S. Cl. ........................................... 303/146; 303/154
[58] Field of Search ..................................... 303/146, 147, 303/148, 149, 141

[56] References Cited

U.S. PATENT DOCUMENTS

| | | | |
|---|---|---|---|
| 4,898,431 | 2/1990 | Karnopp et al. | |
| 5,024,285 | 6/1991 | Fujita | 303/140 |
| 5,229,944 | 7/1993 | Yasuno | 303/146 |
| 5,344,224 | 9/1994 | Yasuno | 303/154 |
| 5,428,532 | 6/1995 | Yasuno | 303/146 |

FOREIGN PATENT DOCUMENTS 2-70561  3/1990  Japan.

*Primary Examiner*—Matthew C. Graham
*Attorney, Agent, or Firm*—Smith, Gambrell & Russell, LLP

[57] ABSTRACT

A braking force control system and method of a vehicle includes a vehicle speed detecting section, a steering angle detecting section, a yaw rate detecting section, a target yaw rate calculating section, a yaw rate deviation calculating section, turning requirement detecting means for detecting a driver's requirement to turn the vehicle, brake pressure correction coefficient generating section, a target braking force calculating section, a braking force correction section for correcting the braking force according to the driver's requirement to turn the vehicle, a braking wheel determining section for determining an object wheel to apply brakes, an output judging section, a brake signal outputting section and a brake drive apparatus for applying brake pressure to the wheel cylinder of the object wheel. Whereby, the driver can make a sharp turn even when the normal braking force control is operative.

18 Claims, 13 Drawing Sheets

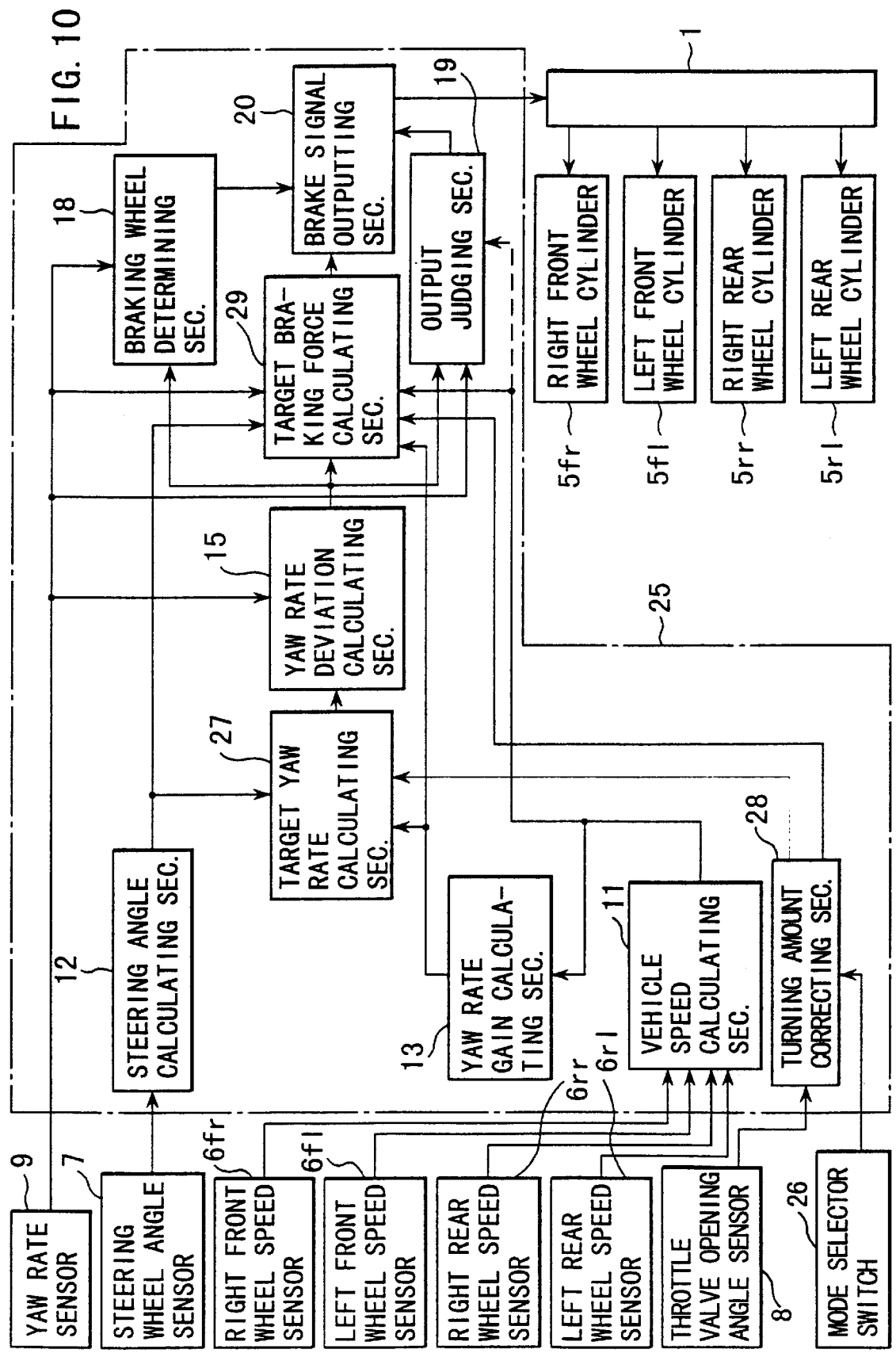

BRAKING FORCE CONTROL SYSTEM FOR TURNING HAVING CORRECTION PARAMETERS CAPABILITIES AND METHOD THEREOF

BACKGROUND OF THE INVENTION

1. Field of the Invention

The present invention relates to a braking force control system and method of a vehicle for properly applying braking force to wheels so as to make a stable and smooth turn when cornering.

2. Prior Arts

In recent years, due to an increasing concern about vehicle safety, many techniques for safe driving have been developed. Among them, there are several proposed technologies in which when a vehicle turns corners, an optimally controlled braking force is applied to wheels based on vehicle driving conditions data for accomplishing a stable and smooth cornering of the vehicle.

For example, Japanese Unexamined Patent Application Toku-Kai-Hei 2-70561 discloses a braking force control apparatus for controlling braking force on the basis of a yaw rate or an angular velocity of yawing, i.e., a rotational motion about a vertical axis passing through a center of gravity of the vehicle. In this technology, it is judged whether the vehicle is turning in an under-steer condition or in an over-steer condition with respect to a target yaw rate by comparing an actual yaw rate with the target yaw rate and if the vehicle is in an under-steer condition, braking force is applied to inner wheels (wheels on the side of a turning center) to correct under-steer such that a deviation of the actual yaw rate from the target yaw rate is minimized and if the vehicle is in an over-steer condition, braking force is applied to outer wheels (wheels on the opposite side of a turning center) to correct over-steer.

In this technique, however, since the system is constituted such that a running stability of the vehicle is always restored by applying braking force to a proper wheel, it is difficult to give an intentional turn to the vehicle in such a case where a driver tries to avoid an obstacle by way of an operation other than steering, for example, an accelerator pedal operation.

SUMMARY OF THE INVENTION

Accordingly, the present invention is intended to obviate the disadvantages of the known braking force control system and it is an object of the present invention to provide a braking force control system, capable of easily turning the vehicle whenever a driver intends to make a large (sharp) turn intentionally with operation other than steering.

A braking force control system according to the present invention comprises:

vehicle speed detecting means for detecting a vehicle speed;

steering angle detecting means for detecting a steering angle;

yaw rate detecting means for detecting an actual yaw rate of the vehicle;

yaw rate gain calculating means for calculating a yaw rate gain based on the vehicle speed;

target yaw rate calculating means for calculating a target yaw rate based on the vehicle speed, the steering angle and the yaw rate gain;

yaw rate deviation calculating means for calculating a yaw rate deviation of the target yaw rate from the actual yaw rate;

turning requirement detecting means for detecting a driver's requirement to make a positive turn of the vehicle and for outputting a requirement magnitude signal presenting a magnitude of the driver's requirement;

brake pressure correction coefficient generating means for generating a brake pressure correction coefficient corresponding to the requirement magnitude signal;

target braking force calculating means for calculating a target braking force based on the yaw rate deviation, the steering angle, the yaw rate gain, the vehicle speed and the actual yaw rate;

braking force correcting means for correcting the target braking force with the brake pressure correction coefficient such that the target braking force of the front wheel is corrected to a small value and the target braking force of the rear wheel is corrected to a large value and for outputting a corrected target braking force;

braking wheel determining means for determining a braking wheel based on the actual yaw rate and the yaw rate deviation such that the rear wheel on the side of a turning center is selected as the braking wheel when the actual yaw rate differs from the yaw rate deviation in sign and such that the front wheel on the opposite side of a turning center is selected when the actual yaw rate agrees with the yaw rate deviation in sign;

output judging means for selectively determining a judging threshold value based on the yaw rate deviation, the actual yaw rate and the vehicle speed, for outputting a control signal so as to execute a braking force control when an absolute value of the yaw rate deviation is larger than the threshold value and for outputting a noncontrol signal so as to stop a braking force control when the absolute value of the yaw rate deviation is smaller than the threshold value; and brake signal outputting means responsive to the control signal for outputting a brake signal to the brake drive apparatus so as to apply the target braking force to the braking wheel and responsive to the noncontrol signal for stopping the brake signal to the brake drive apparatus.

BRIEF DESCRIPTION OF THE DRAWINGS

FIG. 10 is a functional block diagram showing a second embodiment of a braking force control system according to the present invention;

DETAILED DESCRIPTION OF THE PREFERRED EMBODIMENTS

Figure 2:
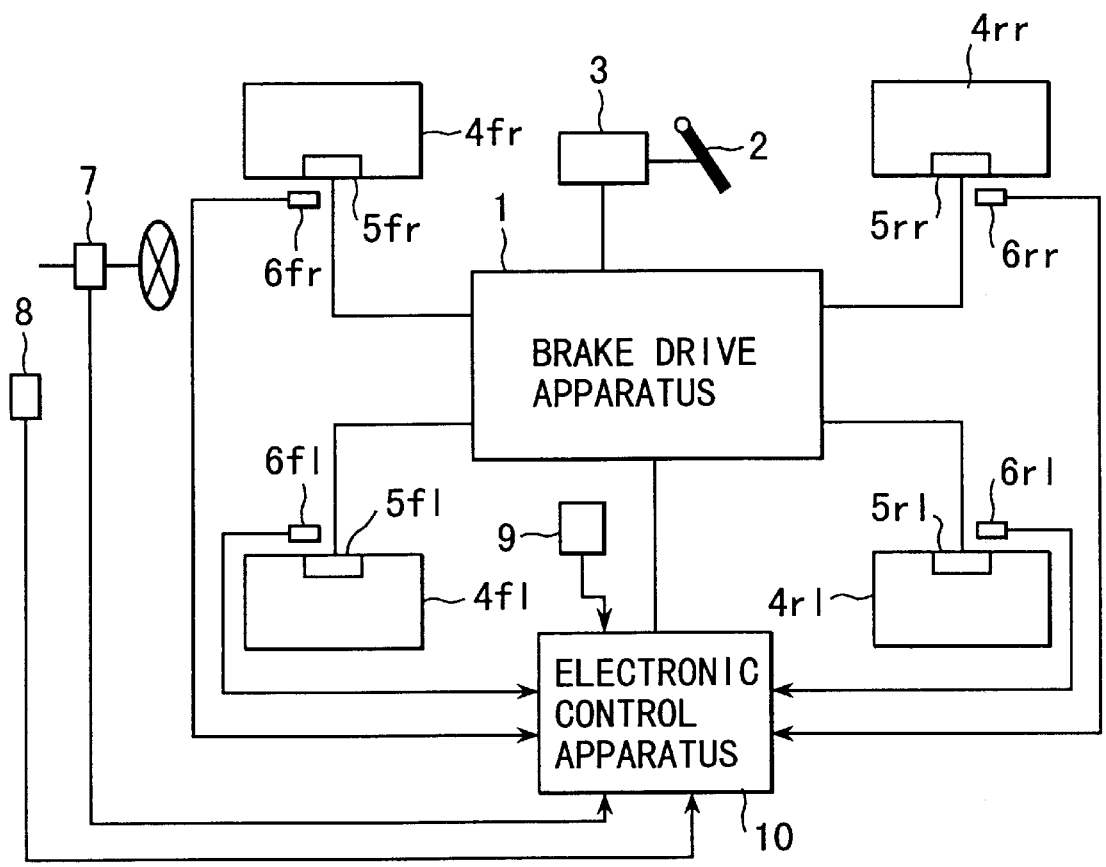
FIG. 2 is a schematic diagram showing a braking force control system according to a first embodiment of the present invention.

Referring now to FIG. 2, numeral 1 denotes a brake drive apparatus to which a brake pedal 2 operated by a vehicle driver and a master cylinder 3 are connected. When the vehicle driver depresses the brake pedal 2, brake pressure is supplied from the master cylinder 3 to each of wheel cylinders, $5_{fl}$ for a left front wheel, $5_{fr}$ for a right front wheel, $5_{rl}$ for a left rear wheel and $5_{rr}$ for a right rear wheel through the brake drive section 1 to apply brakes to four wheels, a left front wheel $4_{fl}$, a right front wheel $4_{fr}$, a left rear wheel $4_{rl}$ and a right rear wheel $4_{rr}$, The brake drive apparatus 1 is a hydraulic unit comprising a pressure source, pressure reducing valves, pressure increasing valves and the like for feeding brake pressure independently to each of the wheel cylinders, $5_{fl}$, $5_{fr}$, $5_{rl}$ and $5_{rr}$, according to input signals.

The wheel speeds of the four wheels are detected independently for each of the four wheels $4_{fl}$, $4_{fr}$, $4_{rl}$, $4_{rr}$ by wheel speed sensors, $6_{fl}$ for the left front wheel, $6_{fr}$ for the right front wheel, $6_{rl}$ for the left rear wheel and $6_{rr}$ for the right rear wheel. Further, a steering wheel angle sensor 7 is disposed at the steering wheel section of the vehicle to detect a rotational angle $\theta$ of the steering wheel. Further, in the intake system of the engine a throttle opening angle sensor 8 is disposed to detect an opening angle $P_{acc}$ of a throttle valve (not shown). The opening angle $P_{acc}$ of the throttle valve is used for functioning vehicle turn requirement detecting means which will be described hereinafter.

Numeral 10 denotes an electronic control apparatus composed of a micro-computer and its peripheral circuits, to which the wheel speed sensor $6_{fl}$, $6_{fr}$, $6_{rl}$ and $6_{rr}$,the steering wheel angle sensor 7, the throttle opening angle sensor 8 and a yaw rate sensor 9 for detecting an actual yaw rate $\gamma$ are connected and from which a drive signal is outputted to the brake drive apparatus 1.

Figure 1:
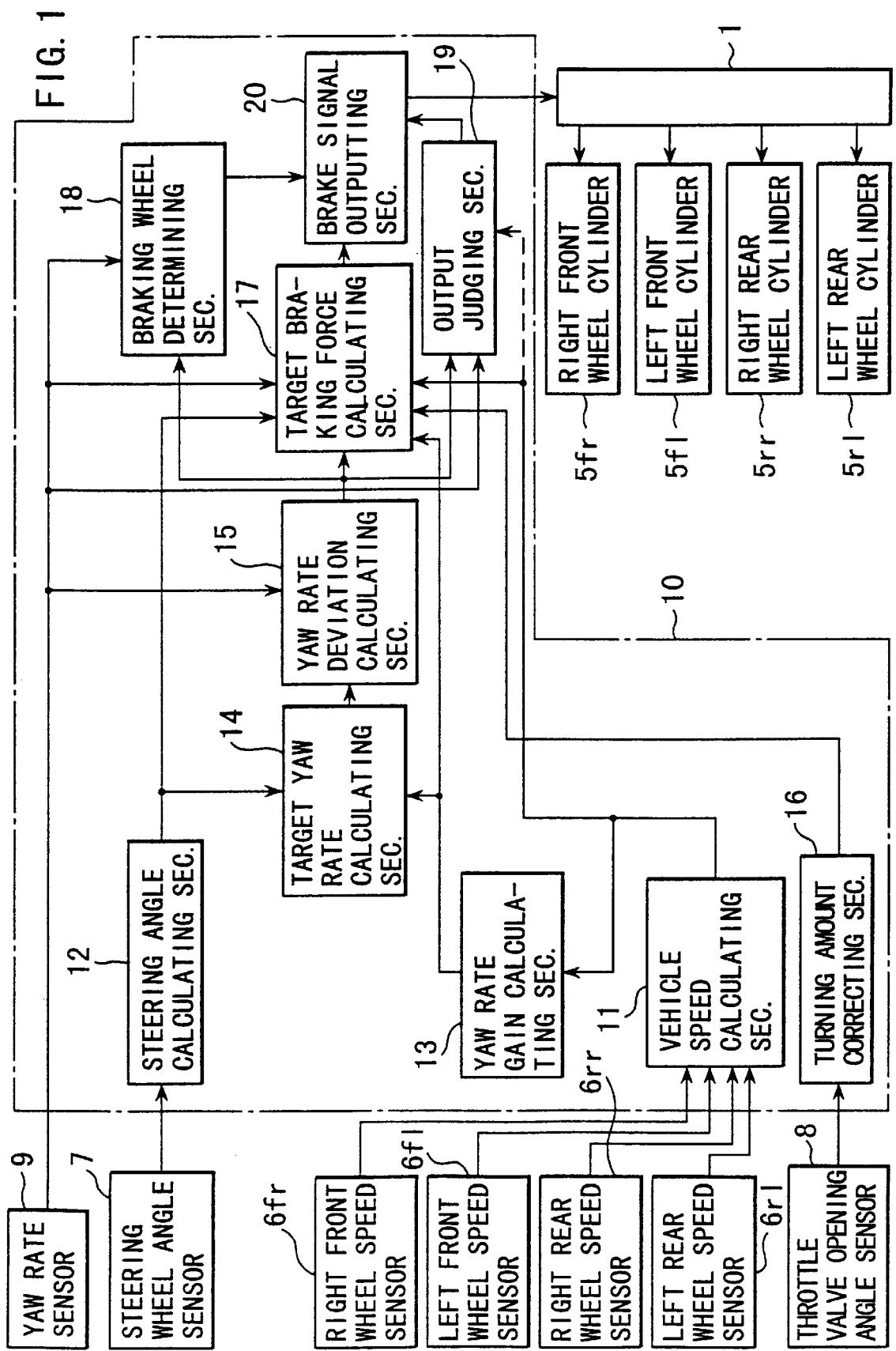
FIG. 1 is a functional block diagram showing a braking force control system according to a first embodiment of the present invention.

As shown in FIG. 1, the electronic control apparatus 10 comprises a vehicle speed calculating section 11, a steering angle calculating section 12, a yaw rate gain calculating section 13, a target yaw rate calculating section 14, a yaw rate deviation calculating section 15, a turning amount correcting section 16, a target braking force calculating section 17, a braking wheel determining section 18, an output judging section 19 and a brake signal outputting section 20.

The vehicle speed calculating section 11 obtains a vehicle speed V by calculating based on wheel speeds $\omega_1$, $\omega_2$, $\omega_3$, $\omega_4$ derived from the wheel speed sensors $6_{fl}$, $6_{fr}$, $6_{rl}$, $6_{rr}$ respectively according to a predetermined formula (for example averaging speed signals from the wheel speed sensors $6_{fl}$, $6_{fr}$, $6_{rl}$ and $6_{rr}$) and outputs the calculated vehicle speed V to the yaw rate gain calculating section 13 and the target braking force calculating section 17.

Further, the steering angle calculating section 12 calculates an actual steering angle $\delta f (=\theta/N)$ by dividing a steering angle $\theta$ derived from the steering angle sensor 7 by a steering gear ratio N and outputs the actual steering angle $\delta f$ to the target yaw rate calculating section 14 and the target braking force calculating section 17.

Further, the yaw rate gain calculating section 13 calculates a yaw rate value (a yaw rate gain $G_{\gamma\delta f}(0)$) with respect to the actual steering angle $\delta f$ when the vehicle turns around a fixed circle and outputs the calculated target yaw rate gain $G_{\gamma\delta f}(0)$ to the target yaw rate calculating section 14 and the target braking force calculating section 17. The yaw rate gain $G_{\gamma\delta f}$ is calculated according to the following formula:

$$G_{\gamma\delta f}(0)=[1/(1+A_0 \cdot V^2)] \cdot V/L \qquad (1)$$

where L is a wheelbase of the vehicle; $A_0$ is a stability factor determined by vehicle specifications. Further, the stability factor $A_0$ is obtained according to the following formula:

$$A_0=[-m \cdot (L_f \cdot CP_f - L_r \cdot CP_r)]/(2 \cdot L^2 \cdot CP_f \cdot CP_r) \qquad (2)$$

where m is a vehicle weight; $L_f$ is a distance between a front axle and a center of gravity; $L_r$ is a distance between a rear axle and a center of gravity; $CP_f$ is an equivalent cornering power for the front tire; $CP_r$ is an equivalent cornering power for the rear tire.

The target yaw rate calculating section 14 calculates a target yaw rate $\gamma'$ taking a delay of response into consideration based on the actual steering angle $\delta f$ derived from the steering angle calculating section 12, the yaw rate gain $G_{\gamma\delta f}(0)$ derived from the yaw rate gain calculating section 13 and outputs the calculated target yaw rate $\gamma'$ to the yaw rate deviation calculating section 15. The target yaw rate $\gamma'$ is calculated according to the following formula:

$$\gamma'=[1/(1+T \cdot s)] \cdot G_{\gamma\delta f}(0) \cdot \delta f \qquad (3)$$

where T is a time constant; s is a Laplacian. The formula (3) is a formula in which the response delay of the vehicle expressed in the second order is approximated to one in the first order. The time constant T is obtained from the following formula:

$$T=(m \cdot L_f \cdot V)/(2 \cdot L \cdot CP_r) \qquad (4)$$

In the yaw rate deviation calculating section 15 a yaw rate deviation $\Delta\gamma$ is obtained by subtracting the target yaw rate $\gamma'$ calculated in the target yaw rate calculating section 14 from the actual yaw rate $\gamma$ detected by the yaw rate sensor 9 and the yaw rate deviation $\Delta\gamma$ is outputted to the target braking force calculating section 17, the braking wheel determining section 18 and the output judging section 19.

The turning amount correcting section 16 establishes a front wheel brake pressure correction coefficient $K_{accf}$ and a rear wheel brake pressure correction coefficient $K_{accr}$ respectively according to a signal (throttle opening angle $P_{acc}$) from the throttle valve opening sensor 8 and outputs them to the target braking force calculating section 17. These correction coefficients are for correcting the target braking force for front and rear wheels calculated in the target braking force calculating section 17.

The target braking force calculating section 17 calculates a target braking force (a front wheel target brake pressure $BF2_f$ and a rear wheel target brake pressure $BF2_r$) based on the vehicle operating conditions and the yaw rate deviation and outputs the calculated target brake pressures $BF2_f$, $BF2_r$ to the brake signal outputting section 20. The target brake pressures $BF2_f$ and $BF2_r$ are calculated for example according to the following formula.

$$BF2_f = G_1 \cdot (\Delta A \cdot 4 \cdot L^2 \cdot CP_f \cdot CP_r \cdot V)/[(CP_f + CP_r)/d_f] \cdot \gamma \quad (5)$$

$$BF2_r = G_1 \cdot (\Delta A \cdot 4 \cdot L^2 \cdot CP_f \cdot CP_r \cdot V)/[(CP_f + CP_r)/d_r] \cdot \gamma \quad (6)$$

where $G_1$ is a gain; $d_f$ is a front tread; and $d_r$ is a rear tread. $\Delta A$ is expressed in the following formula:

$$\Delta A = [\delta f/(G_{\gamma \delta f}(0) \cdot \delta f + \Delta \gamma) - 1/G_{\gamma \delta f}(0)]/(L \cdot V) \quad (7)$$

The yaw rate deviation $\Delta \gamma$ in the formula (7) may be corrected by a side slip angle β (angle contained by a running direction of the vehicle and a lengthwise direction of the vehicle). Further, in order to prevent the rear wheel from slipping due to braking force applied thereto, particularly on a road with a surface having a Low friction coefficient or to prevent the vehicle driver from having an unstable feeling about a strong head turn moment when braking force is applied to the rear wheel, the rear wheel target brake pressure $BF2_r$ may be made smaller than the value obtained in the formula (6) by multiplying a small gain which is Larger than 0 and smaller than 1.

The target brake pressures $BF2_f$, $BF2_r$ obtained from the formulas (5) and (6) are corrected by the front wheel brake pressure correction coefficients $K_{accf}$, $K_{accr}$ and outputted to the brake signal outputting section 20.

$$BF2_f = K_{accf} \cdot BF2_f \quad (8)$$

$$BF2_r = K_{accr} \cdot BF2_r \quad (9)$$

Figure 8A:
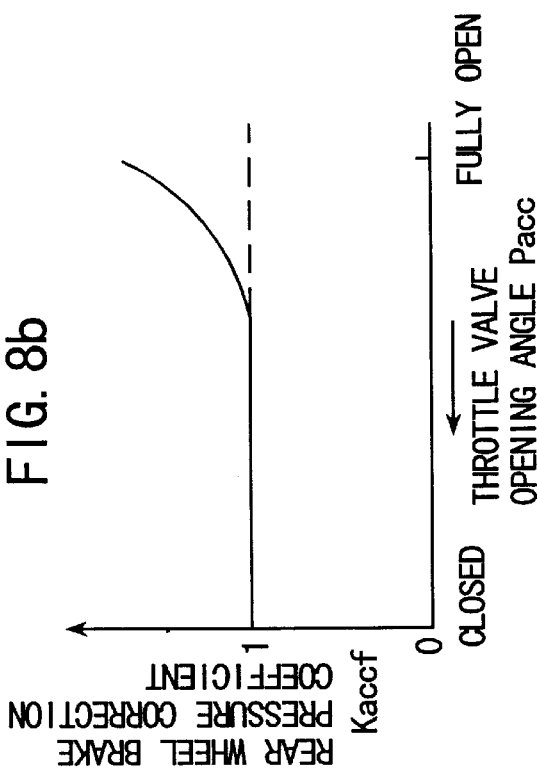
FIG. 8a is an explanatory view showing a characteristic of a brake pressure correction coefficient for a front wheel.

As illustrated in FIG. 8a, the front wheel brake pressure correction coefficient $K_{accf}$ is set to 1 and maintained there until the throttle valve opening angle $P_{acc}$ reaches a specified value. After the throttle valve opening angle $P_{acc}$ exceeds the specified value, the front wheel brake pressure correction coefficient $K_{accf}$ is established so as to decrease gradually with an increase of the throttle valve opening angle $P_{acc}$. That is to say, the target brake pressure $BF2_f$ of the front wheel calculated from the formula (5) is outputted as it is while the throttle valve opening angle Pacc is below the specified value and it is outputted corrected, to a decreased value while the throttle valve opening angle $P_{acc}$ is above the specified value.

Figure 8B:
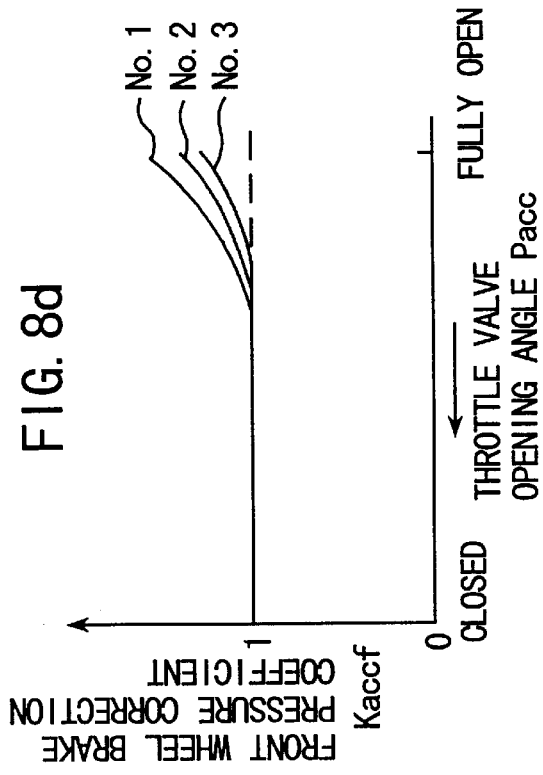
FIG. 8b is an explanatory view showing a characteristic of a brake pressure correction coefficient for a rear wheel.

On the other hand, as shown in FIG. 8b, the rear wheel brake pressure correction coefficient $K_{accr}$ is set to 1 and maintained there until the throttle valve opening angle $P_{acc}$ reaches a specified value. After the throttle valve opening angle $P_{acc}$ exceeds the specified value, the rear wheel brake pressure correction coefficient $K_{accr}$ is established so as to increase gradually with an increase of the throttle valve opening angle Pacc. That is to say, the target brake pressure $BF2_r$ of the rear wheel calculated from the formula (6) is outputted as it is while the throttle valve opening angle $P_{acc}$ is below the specified value and it is outputted to a corrected increased value while the throttle valve opening angle $P_{acc}$ is above the specified value.

Figure 8C:
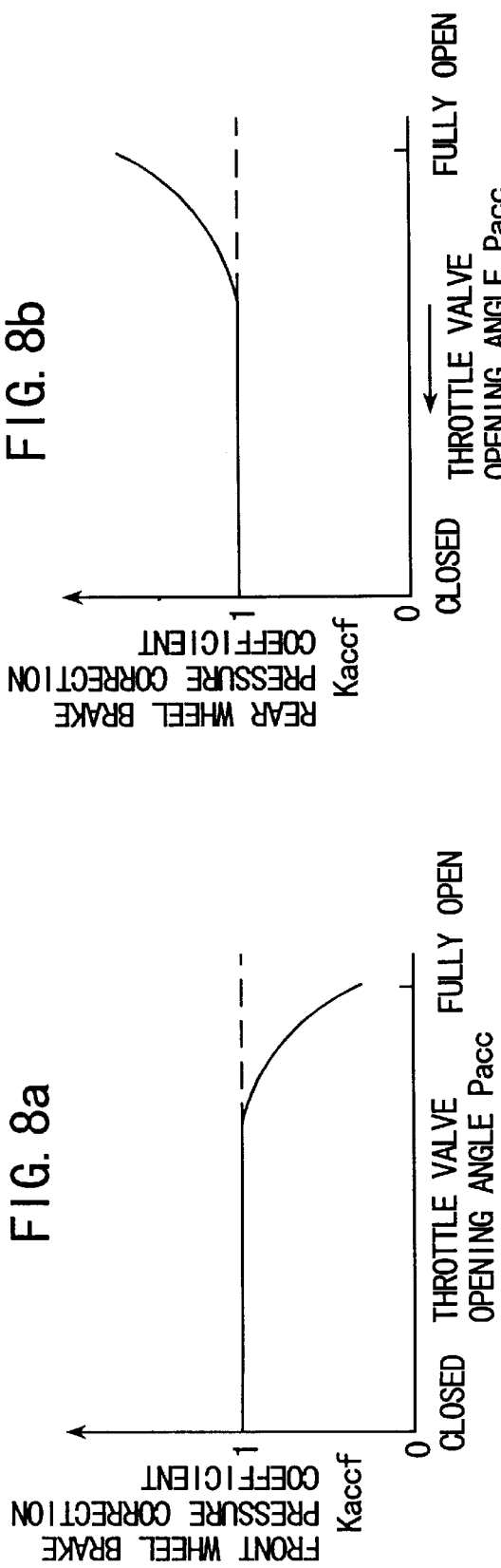
FIG. 8c is an explanatory view showing another characteristic of a brake pressure correction coefficient for a front wheel.
Figure 8D:
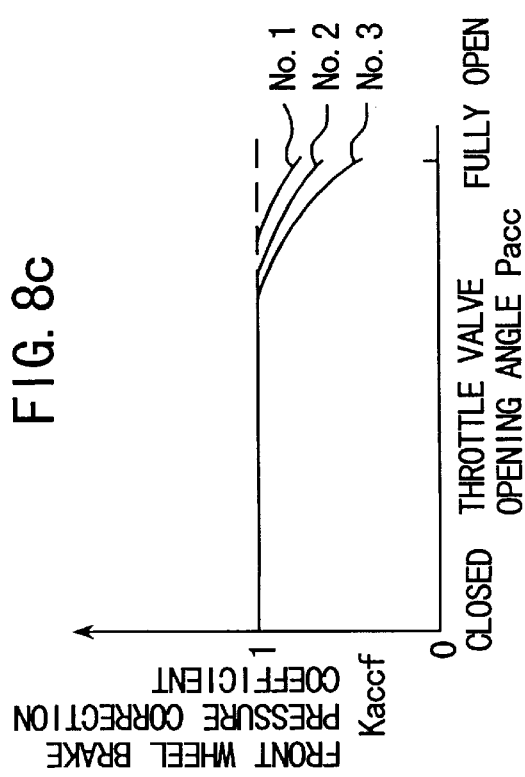
FIG. 8d is an explanatory view showing another characteristic of a brake pressure correction coefficient for a rear wheel.

Further, as an alternative way, the front wheel brake pressure correction coefficient $K_{accf}$ and the rear wheel brake pressure correction coefficient $K_{accr}$ may be selected from a plurality of characteristics according to a driver's choice, as illustrated in FIGS. 8c and 8d.

Figure 3:
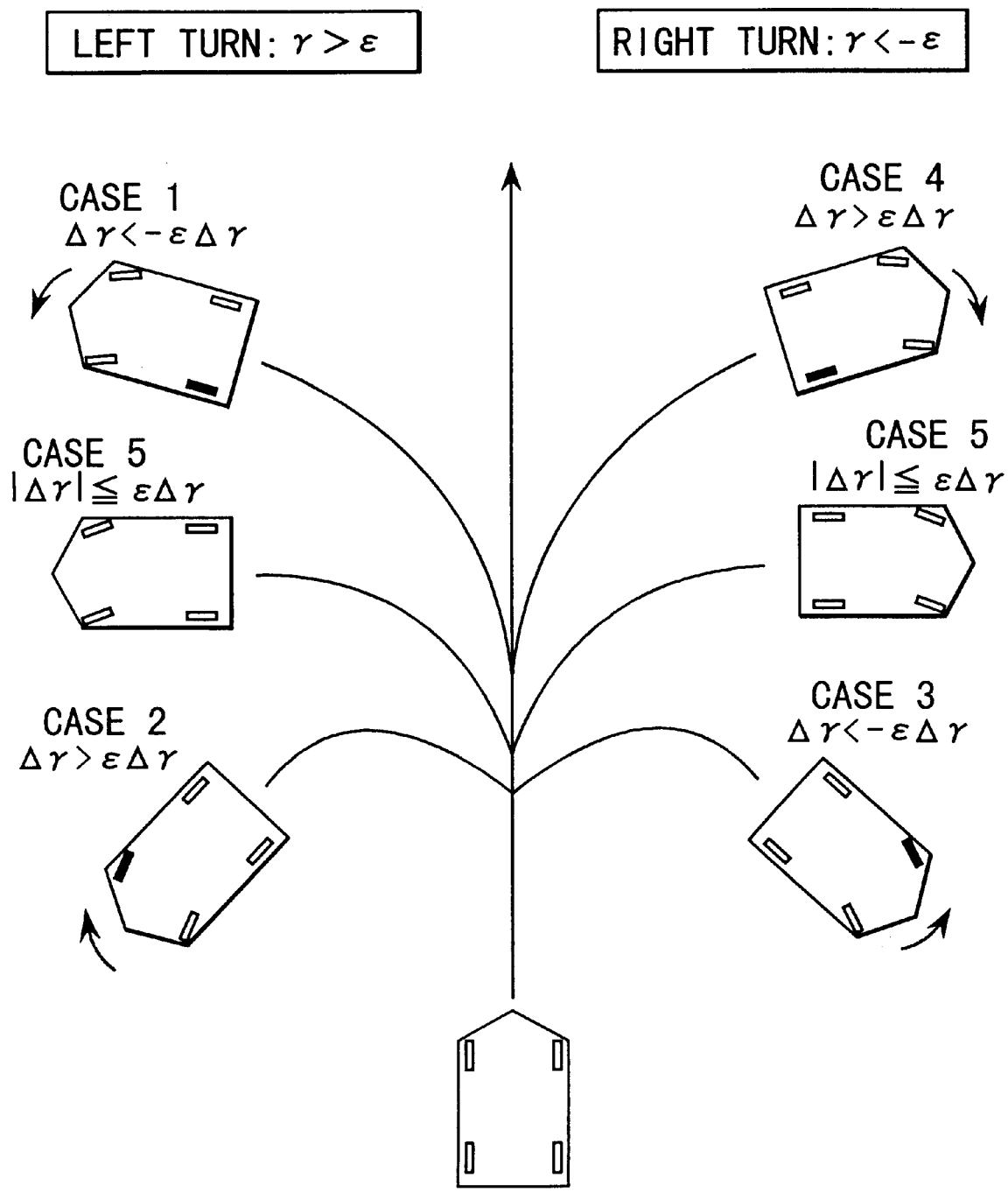
FIG. 3 is an explanatory view showing vehicle behaviors according to a braking force control of a first embodiment.

The braking wheel determining section 18 selects a braking wheel (a wheel to which a brake is to be applied) according to the combination of the sign of the actual yaw rate γ and the sign of the yaw rate deviation $\Delta \gamma$. As to whether the actual and target yaw rates, γ, γ' are plus or minus, a plus sign is given when the vehicle turns to the left and a minus sign is given when the vehicle turns to the right. As shown in FIG. 3, the braking wheel is selected as follows:

Case 1. A brake is applied to the left rear wheel, when γ>ϵ and $\Delta \gamma < -\epsilon \Delta \gamma$, i.e., the vehicle is turning to the left and is in an under-steer tendency with respect to the target yaw rate γ';

Case 2. A brake is applied to the right front wheel, when γ>ϵ and $\Delta \gamma > \epsilon \Delta \gamma$, i.e., the vehicle is turning to the left and is in an over-steer tendency with respect to the target yaw rate γ';

Case 3. A brake is applied to the left front wheel, when γ<ϵ and $\Delta \gamma < -\epsilon \Delta \gamma$, i.e., the vehicle is turning to the right and is in an over-steer tendency with respect to the target yaw rate γ';

Case 4. A brake is applied to the right rear wheel, when γ<ϵ and $\Delta \gamma > \epsilon \Delta \gamma$, i.e., the vehicle is turning to the right and is in an under-steer tendency with respect to the target yaw rate γ'; and Case 5. No brake is applied to any wheel, when $|\gamma| < |\epsilon|$, i.e., the vehicle is almost in a straight running condition, or $|\Delta \gamma| \leq |\epsilon \Delta \gamma|$, i.e., the vehicle is in an almost neutral-steer condition; where ϵ and $\epsilon \Delta \gamma$ are positive values which are nearly equal to zero and these are predetermined through experiments or calculations.

Except for Case 5 where it is judged that the vehicle travels in a straight condition, or that the vehicle is in a neutral-steer condition, when the sign of the actual yaw rate γ is different from that of the yaw rate deviation $\Delta \gamma$ (a case of an under-steer tendency with respect to the target yaw rate γ'), the inner rear wheel is selected as a braking wheel. At this moment, in the case where the throttle valve opening angle $P_{acc}$ is larger than a specified value, since the rear wheel target brake pressure $BF2_r$ is amended to a larger value than the calculated value, the vehicle behavior is corrected toward an over-steer tendency with respect to the target yaw rate γ'.

On the other hand, when the sign of the actual yaw rate γ is the same as that of the yaw rate deviation $\Delta \gamma$ (a case of an over-steer tendency with respect to the target yaw rate γ'), the outer front wheel is selected as a braking wheel. Here, in the case where the throttle valve opening angle $P_{acc}$ is larger than a specified value, since the rear wheel target brake pressure $BF2_f$ is outputted being amended to a smaller value than the calculated value, the vehicle behavior is corrected toward an under-steer tendency with respect to the target yaw rate γ'.

Thus, when the accelerator pedal is depressed more largely than in a normal running, it is judged from the amount of the throttle valve opening angle $P_{acc}$ that a driver has a greater intention to turn the vehicle as he or she depresses the accelerator pedal more deeply. As a result, the vehicle behavior is amended toward an over-steer tendency strongly when the vehicle is in an under-steer tendency with respect to the target yaw rate γ' and the amendment toward under-steer is alleviated when in an over-steer.

The output judging section 19 determines a judging threshold value $\epsilon \Delta$ which will be described hereinafter and judges whether or not the yaw rate deviation $\Delta \gamma$ is in the control area by comparing the yaw rate deviation $\Delta \gamma$ with the judging threshold value $\epsilon \Delta$ and outputs the result of the judgment to the brake signal outputting section 20.

In the judging threshold value $\epsilon\Delta$, a first threshold value $\epsilon\Delta M$ is set when the vehicle is in a normal behavior. When a specified time elapses after the behavior tendency of the vehicle is shifted from under-steer to over-steer, or when either the yaw rate deviation or the actual yaw rate becomes zero after the vehicle is shifted to an over-steer tendency, a second threshold value $\epsilon\Delta S$ is set as the judging threshold value $\epsilon\Delta$. The first threshold value $\epsilon\Delta M$ and second threshold value $\epsilon\Delta S$ are both positive numbers which have been obtained from experiments, calculations or the like beforehand. Further, the relationship between these threshold values is $\epsilon\Delta M > \epsilon\Delta S \geq \epsilon\Delta\gamma$.

Figure 9A:
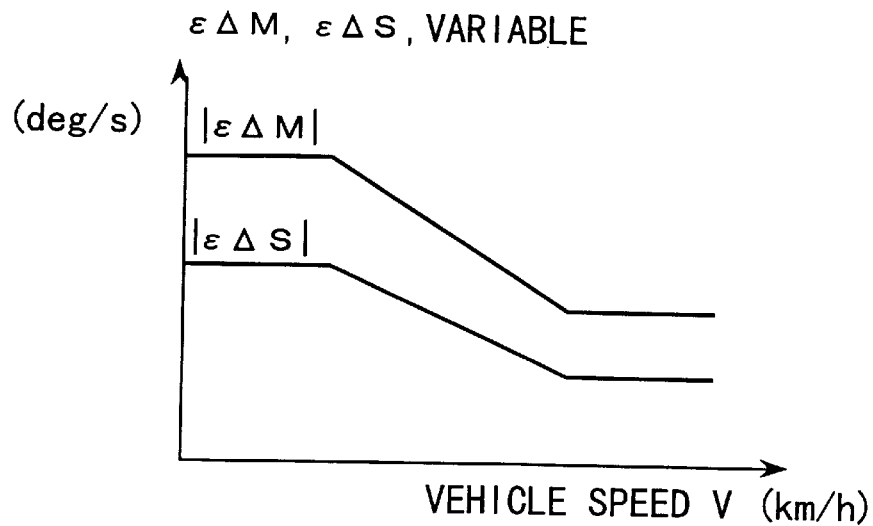
FIGS. 9a, 9b and 9c are explanatory drawings showing several examples of a characteristic of a judging threshold value.
Figure 9B:
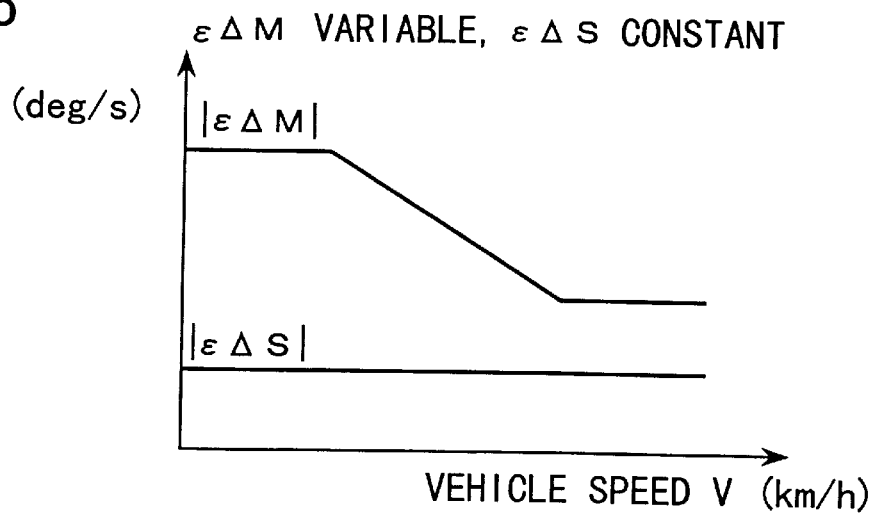
Figure 9C:
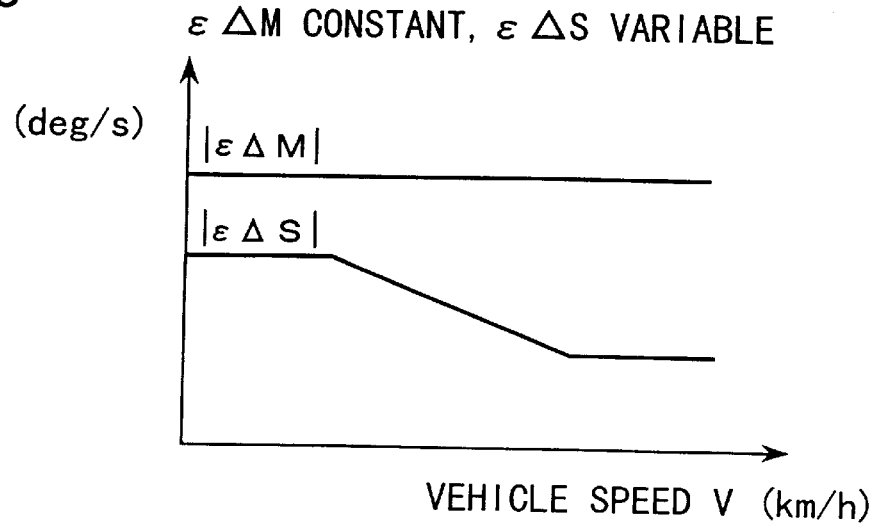
Figure 11:
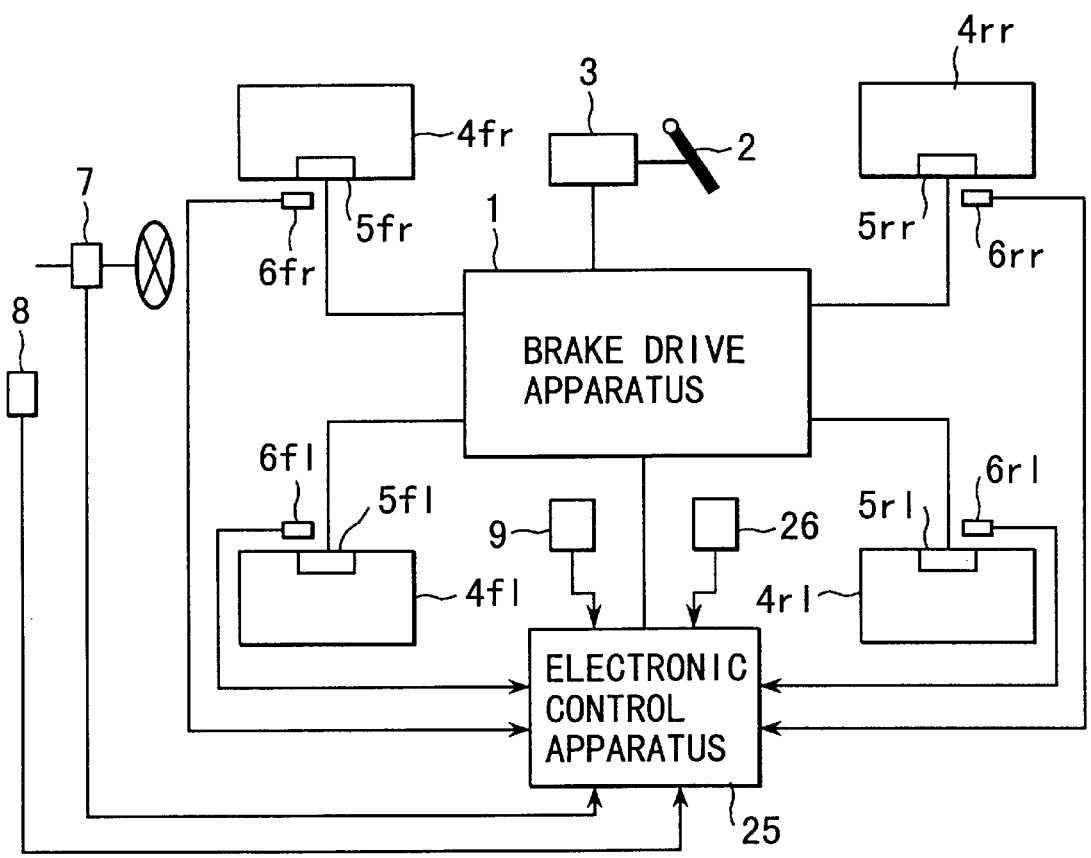
FIG. 11 is a schematic diagram showing a second embodiment of a braking force control system according to the present invention.

The first threshold value $\epsilon\Delta M$ and the second threshold value $\epsilon\Delta S$ are stored on maps as shown in FIG. 9a to FIG. 9c. When the vehicle behavior becomes unstable at low speed, a vehicle e driver can more easily correct the vehicle posture than at high speed and hence a noncontrol zone, i.e., a zone where the control is not needed, can be established with a broader range. In an example of the threshold values shown in FIG. 9a, both the first and second threshold values, $\epsilon\Delta M$ and $\epsilon\Delta S$ are established in such a way that these values are decreased with an increase of vehicle speed. In an example shown in FIG. 9b, only the first threshold value $\epsilon\Delta M$ becomes small with an increase of vehicle speed while the second threshold value $\epsilon\Delta S$ is held constant. Further, in an example shown in FIG. 9c, while the first threshold value $\epsilon\Delta M$ is held constant, the second threshold value $\epsilon\Delta S$ becomes small with an increase of vehicle speed.

When the output judging section 19 outputs a judging signal indicating that the yaw rate deviation is in the control zone, the brake signal outputting section 20 sends an output signal to the brake drive apparatus 1 such that either of the target brake pressures $BF2_f$ or $BF2_r$ which have been calculated in the target brake pressure calculating section 17 is applied to the wheel selected in the braking wheel determining section 18.

Figure 4:
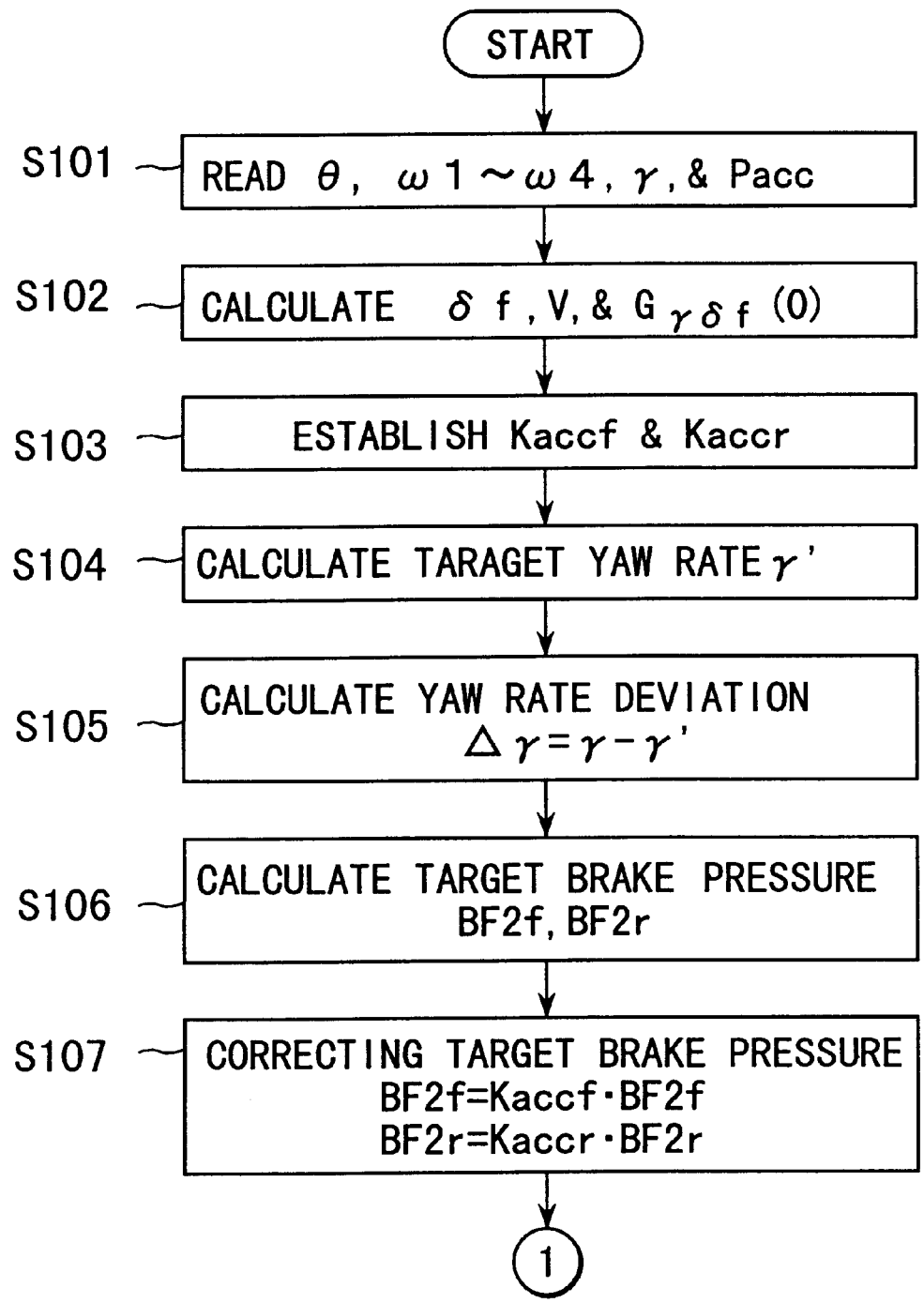
FIG. 4 is a flowchart of a braking force control according to a first embodiment of the present invention.
Figure 5:
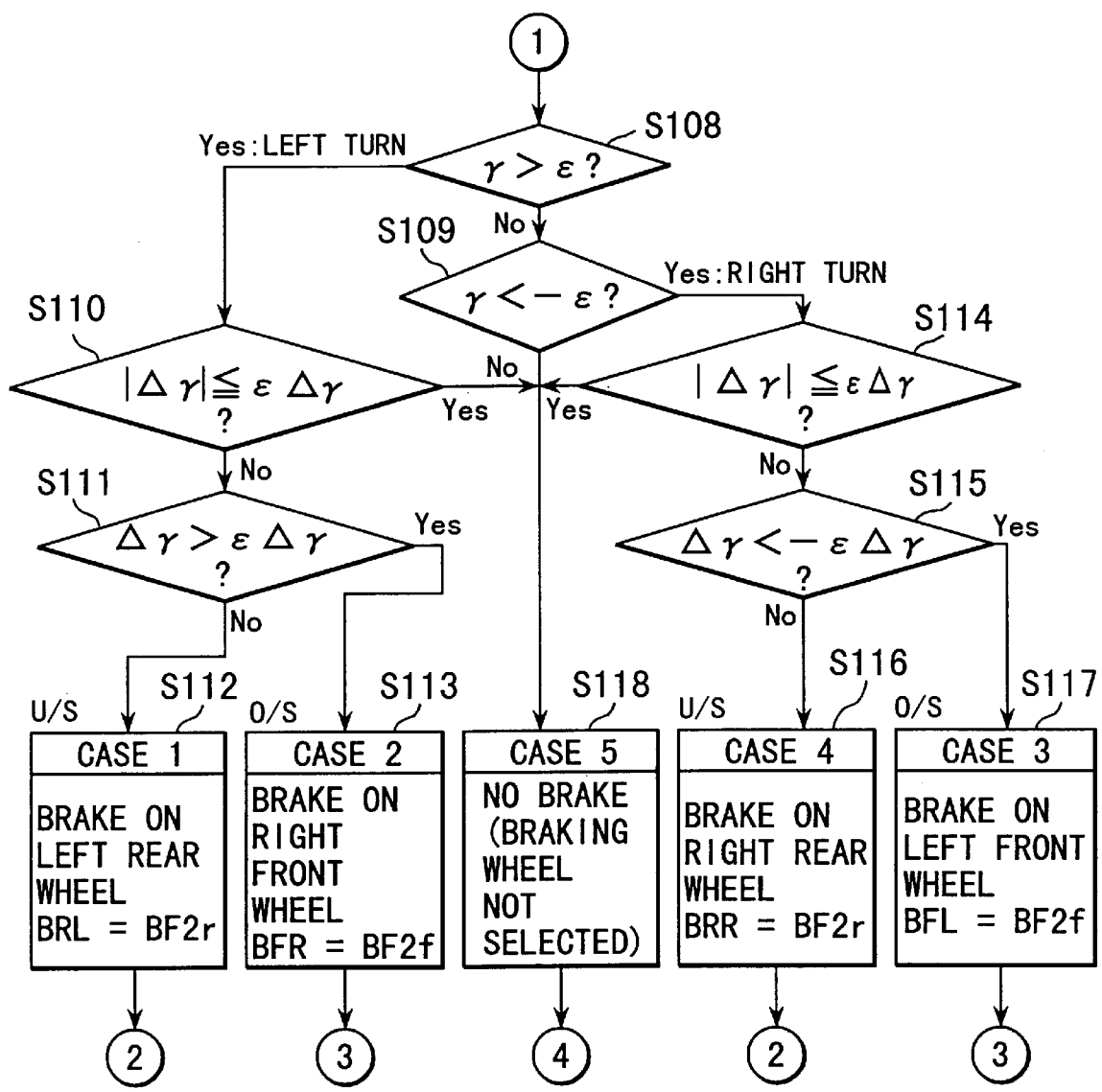
FIG. 5 is a flowchart continued from the one shown in FIG. 4.
Figure 6:
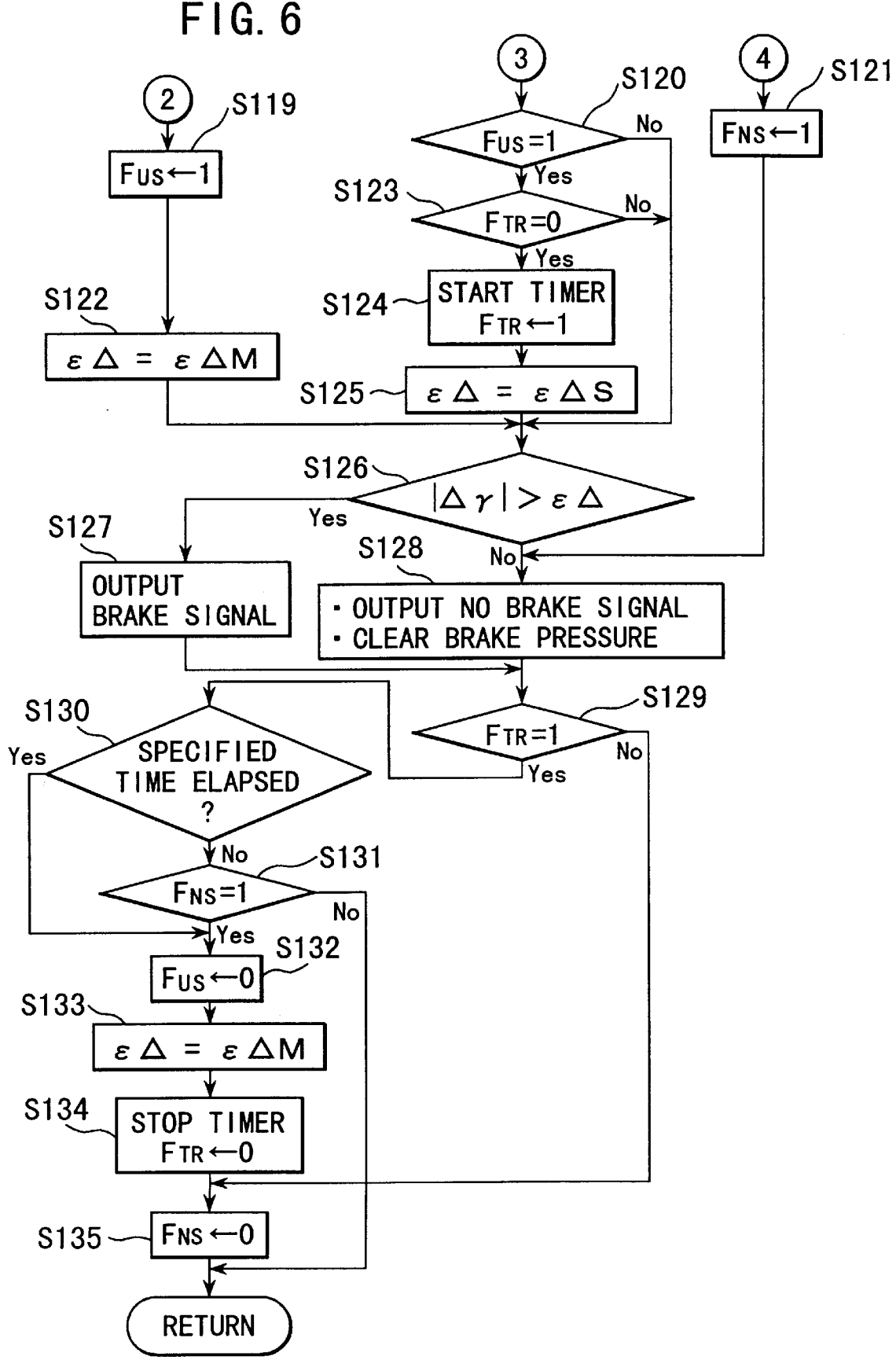
FIG. 6 is a flowchart continued from the one shown in FIG. 5.

Next, an operation of the braking force control according to the first embodiment of the present invention will be described with reference to flowcharts shown in FIG. 4, FIG. 5 and FIG. 6. The control program for the braking force control system is executed at a specified time interval (for example 10 milli-second) during running of the vehicle. When the program starts, at a step S101 a steering wheel angle $\theta$ is read from the steering wheel angle sensor 7, wheel speeds $\omega_1$, $\omega_2$, $\omega_3$, $\omega_4$ are read out from the wheel speed sensors $6_{fl}$, $6_{fr}$, $6_{rl}$, $6_{rr}$, an actual yaw rate $\gamma$ from the yaw rate sensor 9 and a throttle valve opening angle $P_{acc}$ from the throttle valve opening angle sensor 8, respectively and then the program goes to S102.

At S102 an actual steering angle $\delta_f$ is calculated from the steering wheel angle $\theta$ ($\delta f=\theta/N$) in the steering angle calculating section 12 and a vehicle speed V is (calculated from the wheel speeds $\omega_1$, $\omega_2$, $\omega_3$, $\omega_4$ in the vehicle speed detecting section 11. Further, a yaw rate gain $G_{\gamma\delta f}$ (0) is calculated according to the formula (1) in the yaw rate gain calculating section 13.

Then, the program goes to S103 and there the front wheel brake pressure correction coefficient $K_{accf}$ and the rear wheel brake pressure correction coefficient $K_{accr}$ are established according to the throttle opening angle $P_{aac}$ in the turning amount correcting section 16.

Then, the program goes to S104 where the target yaw rate $\gamma'$ is calculated according to the formula (3) in the target yaw rate calculating section 14. Then, the program goes to S105 where a yaw rate deviation $\Delta\gamma$ ($=\gamma-\gamma'$) is calculated in the yaw rate deviation calculating section 15 and at S106 a front wheel target brake pressure $BF2_f$ and a rear wheel target brake pressure $BF2_r$ is calculated in the target braking force calculating section 17 according to the formulas (5) and (6), respectively.

At S107, the front wheel brake pressure $BF2_f$ and the rear wheel target brake pressure $BF2_r$ are corrected with the front wheel brake pressure correction coefficient $K_{accf}$ and the rear wheel brake pressure correction coefficient $K_{accr}$ respectively according to the formulas (8) and (9) in the target braking force calculating section 17.

The steps S108 to S118 are steps performed in the braking wheel determining section 18. First, at S108 it is judged whether or not the actual yaw rate $\gamma$ is larger than $\epsilon$, that is to say, whether or not the vehicle is making a relatively large left turn and if the actual yaw rate $\gamma$ is less than e the program goes to S109 where it is judged whether or not the actual yaw rate $\gamma$ is smaller than $-\epsilon$, that is to say, whether or not the vehicle is making a relatively Large right turn. If at S109 it is judged to be $\epsilon \geq \gamma \geq -\epsilon$, since it can be judged that the vehicle is making neither a left turn nor a right turn, namely since it can be judged that the vehicle is running roughly in a straight condition, no braking wheel is selected (no brake is applied to any wheel) at S118. If at S108 it is judged that $\gamma$ is larger than $\epsilon$ ($\gamma > \epsilon$), the program goes to S110 where it is judged whether or not the yaw rate deviation $\Delta\gamma$ is near zero according to the formula of inequality $|\Delta\gamma\{\leq|\epsilon\Delta\gamma|$, namely, it is judged whether or not the vehicle is roughly in a neutral-steer condition.

Further, at S110 if $|\Delta\gamma| \leq |\epsilon\Delta\gamma|$, namely, it is judged that the actual yaw rate $\gamma$ is roughly equal to the target yaw rate $\gamma'$, the program steps to S118 and if otherwise (in an under-steer tendency or in an over-steer-tendency), the program goes to S111.

The step S111 is a step where it is judged whether or not the vehicle is either in an under-steer tendency or in an over-steer tendency. At S111 if $\Delta\gamma < -\epsilon\Delta\gamma$ and the sign of the yaw rate deviation $\Delta\gamma$ is negative differently from the sign of the actual yaw rate $\gamma$, it is judged that the vehicle is in an under-steer tendency with respect to the target yaw rate $\gamma'$ and the program steps to S112 where a left rear wheel $4_{rl}$ is selected as a braking wheel.

Furthers at S111 if $\Delta\gamma > \epsilon\Delta\gamma$ and the sign of the yaw rate deviation $\Delta\gamma$ is positive similarly to the sign of the actual yaw rate $\gamma$, it is judged that the vehicle is in an over-steer tendency with respect to the target yaw rate $\gamma'$ and the program steps to S113 where a right front wheel $4_{fr}$ is selected as a braking wheel.

On the other hand, at S109 if it is judged that the yaw rate $\gamma$ is less than $-\epsilon$ ($\gamma < -\epsilon$), that is, if it is judged that the vehicle is making a relatively large right turn, the program steps to S114 where it is judged whether or not the yaw rate deviation $\Delta\gamma$ is near zero according to the formula of inequality $|\Delta\gamma| \leq |\epsilon\Delta\gamma|$, namely, it is judged whether or not the vehicle is roughly in a neutral-steer.

At S114, if $|\Delta\gamma| \leq |\epsilon\Delta\gamma|$ and it is judged that the vehicle is roughly in a neutral-steer, the program goes to S118 and if otherwise (either in an under-steer tendency or in an over-steer tendency), the program goes to S115.

The step S115 is a step where it is judged whether the vehicle is in an under steer tendency or in an over-steer tendency according to $\Delta\gamma > \epsilon\Delta\gamma$ or $\Delta\gamma < -\epsilon\Delta\gamma$. If $\Delta\gamma > \epsilon\Delta\gamma$ and the sign of the yaw rate deviation $\Delta\gamma$ is positive differently from the sign of the actual yaw rate $\gamma$, it is judged that the vehicle is in an under-steer tendency with respect to the target yaw rate $\gamma'$ and then the program goes to S116. On the other hand, if $\Delta\gamma < -\epsilon\Delta\gamma$ and the sign of the yaw rate deviation $\Delta\gamma$ is negative similarly to the sign of the actual yaw rate $\gamma$, it is judged that the vehicle is in an over-steer tendency with respect to the target yaw rate $\gamma'$ and then the program goes to S117.

When the program goes to S116, a right rear wheel $4_{rr}$ is selected as a braking wheel. Further, when the program goes to S117, a left front wheel $4_{fl}$ is selected as a braking wheel.

Further, when the program goes from S109, S110 or S114 to S118, no braking wheel is selected and consequently no brake is applied.

Further, in case where a braking wheel is selected at S112 or S116 in an under-steer tendency, the program goes to S119 and in case where a braking wheel is selected at S113 or S117 in an over-steer tendency, the program goes to S120. Further, in case where no braking wheel is selected at S118, the program goes to S121.

When the program goes to S119, an under-steer flag $F_{US}$ is set to 1 ($F_{US}\leftarrow 1$) and then the program steps to S122 where the judging threshold value $\epsilon\Delta$ is set to a first threshold value $\epsilon\Delta M$. The under-steer flag $F_{US}$ is a flag for indicating that the vehicle has been driven in an under-steer tendency. It is cleared ($F_{US} \leftarrow 0$), when a specified time has elapsed since the vehicle is shifted to an over-steer tendency or when the vehicle is shifted from an over-steer tendency to a neutral-steer tendency.

On the other hand, when the program goes to S120, it is judged whether or not the under-steer flag $F_{US}$ has been set to 1 ($F_{US}=1$). If it is judged that the flag has been set to 1, namely, if it is judged that the vehicle has been driven in an under-steer tendency, the program steps to S123 and if it is cleared, the program skips to S126. In general, when the friction coefficient of a road surface is low, the vehicle comes to an under-steer tendency. When the braking force control changes the vehicle behavior from an under-steer to an over-steer tendency, since the under-steer flag $F_{US}$ has been set, the program steps from S120 to S123. However, in case where the vehicle is shifted directly to an over-steer tendency without passing through an under-steer tendency for some reason or other, the program skips to S126 without processing steps S123 to S125.

When the program goes to S123 after judging $F_{US}=1$ at S120, it is judged whether or not a timer start flag $F_{TR}$ has been cleared ($F_{TR}=0$). The timer start flag $F_{TR}$ is a flag which is set ($F_{TR}\leftarrow 1$) when the threshold value determining timer starts and is cleared ($F_{TR}=0$) when it stops.

If it is judged at S123 that the timer start flag $F_{TR}$ has been cleared ($F_{TR}=0$) and the threshold value determining timer has stopped, the program steps to S124 where the threshold value determining timer is started and at the same time the timer start flag $F_{TR}$ is set and then goes to S125. At S125, the judging threshold value $\epsilon\Delta$ is set to a second threshold value $\epsilon\Delta S$. On the other hand, if it is judged at S123 that the timer start flag $F_{TR}$ has been set ($F_{TR}=1$) and the timer is operated, the program skips to S126.

When the program goes to S126 from either of S122, S120, S123, S125, the yaw rate deviation $\Delta\gamma$ is compared with the judging threshold value $\epsilon\Delta$ (comparison in absolute value). If $|\Delta\gamma|>|\epsilon\Delta|$ at S126, the program goes to S125 where a brake signal is outputted from the brake signal outputting section 20 to the brake drive apparatus 1. That is to say, if it is judged at S126 that the yaw rate deviation $\Delta\gamma$ is in the control zone, the brake drive apparatus 1 generates a corresponding brake pressure to a corresponding braking wheel for braking. More specifically, in the case where the program comes from S112 through S119, the brake pressure $BF2_{rl}$ is sent to the wheel cylinder $5_{rl}$, in the case where the program comes from S116 through S119, the brake pressure $BF2_{rr}$ is sent to the wheel cylinder $5_{rr}$, in the case where the program comes from S113 through 120, the brake pressure $BF2_{fl}$ is sent to the wheel cylinder $5_{fl}$ and in the case where the program comes from S117 through S120, the brake pressure $BF2_{f}$ is sent to the wheel cylinder $5_{fl}$.

On the other hand, if it is judged at S126 that the yaw rate deviation $\Delta\gamma$ is within the noncontrol zone ($|\Delta\gamma|\leq|\epsilon\Delta|$), the program advances to S128.

Further, when the program goes from S118 to S121, a normal operation flag $F_{NS}$ is set ($F_{NS}\leftarrow 1$) and the program steps to S128. The normal operation flag $F_{NS}$ is a flag for indicating that the actual yaw rate $\gamma$ is approximately equal to the target yaw rate $\gamma'$ or that the vehicle is roughly in a straight running condition.

When the program goes from S121 or S126 to S128, no brake signal is outputted and further the established brake pressure is cleared. These steps S127 or S128 are executed in the brake signal outputting section 20.

When the program steps from S128 to S129, it is judged whether or not the timer start flag $F_{TR}$ is set (whether or not the threshold value determining timer is operative). If it is judged at S129 that the timer start flag $F_{TR}$ has been cleared, namely, the threshold value determining timer is not operative, the program skips to S135 where the normal operation flag $F_{NS}$ is cleared and then the program goes out of the routine. If the timer start flag $F_{TR}$ has been set, namely, the threshold value determining timer is operative, the program steps to S130 in which it is judged whether or not a specified time has elapsed.

If it is judged at S130 that a specified time has elapsed, the program skips to S132 where the under-steer flag $F_{US}$ is cleared. Then, at S133 the judging threshold value $\epsilon\Delta$ is set to a first threshold value $\epsilon\Delta M$ and at a next step S134 the threshold value determining timer is stopped to clear the timer start flag $F_{TR}$ ($F_{TR}\leftarrow 0$). After that, the program steps to S135 where the normal operation flag $F_{NS}$ is cleared and then goes out of the routine.

On the other hand, if it is judged at S130 that a specified time has not elapsed, the program steps to S131 in which it is judged whether or not the normal operation flag $F_{NS}$ is set ($F_{NS}=1$). If the normal operation flag $F_{NS}$ is cleared ($F_{NS}=0$), the program goes out of the routine and if $F_{NS}$ is set, the program steps to S132 where the under-steer flag $F_{US}$ is cleared ($F_{US}\leftarrow 0$). Then, at S131 the judging threshold value $\epsilon\Delta$ is set to a first threshold value $\epsilon\Delta M$ and after that at S134 the threshold value determining timer is stopped to clear the timer start flag $F_{TR}$ ($F_{TR}\leftarrow 0$). Then, the program goes out of the routine after the normal operation flag $F_{NS}$ is cleared ($F_{NS}\leftarrow 0$) at S135.

That is to say, even before the threshold value determining timer is counted out, when the vehicle comes to a straight running condition, the judging threshold value $\epsilon\Delta$ is set to the first threshold value $\epsilon\Delta M$.

Figure 7:
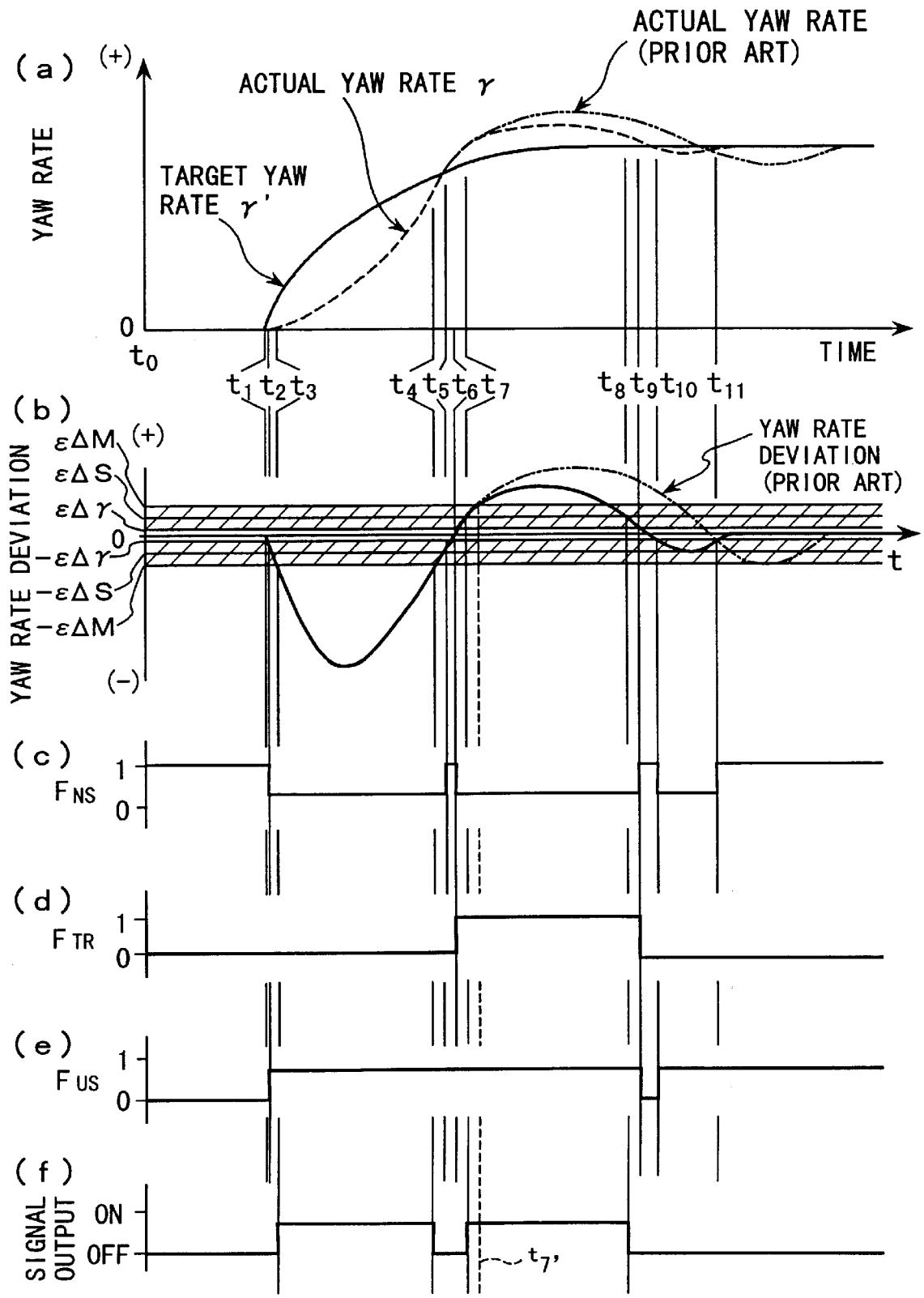
FIG. 7 is an example of a time chart of a braking force control according to a first embodiment of the present invention.

Next, FIG. 7 depicts an example of the braking force control described with reference to flowcharts in FIG. 4, FIG. 5 and FIG. 6. This figure shows a time chart of a case where a vehicle that has been continued to be operated in a straight running condition since a time $t_0$ makes a left turn at a time $t_1$. The time chart includes a change of the target yaw rate $\gamma'$, a change of the actual yaw rate $\gamma$, a change of the yaw rate deviation $\Delta\gamma$, a mode of the normal operation flag $F_{NS}$, a mode of the timer start flag $F_{TR}$, a mode of the under-steer flag $F_{US}$ and an output of the brake signal from the brake signal outputting section 20 respectively.

After a time $t_1$, the actual yaw rate $\gamma$ increases with a gradually increasing target yaw rate $\gamma'$. The yaw rate deviation $\Delta\gamma$ of the target yaw rate $\gamma'$ from the actual yaw rate $\gamma$ also increases gradually in a negative direction.

After a time $t_2$, the absolute value $|\Delta\gamma|$ of the yaw rate deviation $\Delta\gamma$ becomes larger than the threshold value $\epsilon\Delta\gamma$ for judging the state of the actual yaw rate $\gamma$ almost agreeing with the target yaw rate $\gamma'$. At this moment, the vehicle comes into an under-steer tendency, thereby the under-steer flag $F_{US}$ is set. The normal operation flag $F_{NS}$ which has been set is cleared at $t_2$ and after. Further, the judging threshold value $\epsilon\Delta$ for judging the noncontrol area (an area with bias lines) has been set to a first threshold value $\epsilon\Delta M$ and therefore no brake signal is outputted until a time $t_3$ when the absolute value $|\Delta\gamma|$ of the yaw rate deviation $\Delta\gamma$ becomes larger than the judging threshold value $\epsilon\Delta$ for judging the noncontrol zone.

Further, after a time $t_3$ brake signals are allowed to be outputted until a time $t_4$ when the absolute value $|\Delta\gamma|$ of the yaw rate deviation $\Delta\gamma$ becomes smaller again than the judging threshold value $\epsilon\Delta$. In this case, the output mode of brake signal is Case 1 shown in FIG. 3 because of $\gamma>\epsilon$ (a positive sign and a left turn) and $\Delta\gamma<-\epsilon\Delta\gamma$ (a negative sign and an under-steer tendency). In Case 1, brake is applied to the left rear wheel $4_{rl}$ so as to correct the vehicle behavior by a moment produced in the arrow direction, thereby a drift-out phenomenon of the vehicle is prevented. In this state, even when the Left rear wheel $4_{rl}$ is locked and loses a side force due to an excessive braking on the left rear wheel $4_{rl}$, the vehicle still keeps an over-steer tendency and generates a yaw rate having the same direction (an arrow direction) as the nature of the control.

Between times $t_4$ and $t_5$, although the vehicle is still in an under-steer tendency, the actual yaw rate $\gamma$ comes close to the target yaw rate $\gamma'$ and the absolute value $|\Delta\gamma|$ of the yaw rate deviation $\Delta\gamma$ becomes smaller than the judging threshold value $\epsilon\Delta$. In this situation, since the vehicle is located in the noncontrol zone, no brake signal is outputted. Further, between times $t_5$ and $t_6$, the absolute value $|\Delta\gamma|$ of the yaw rate deviation $\Delta\gamma$ becomes smaller than the threshold value $\epsilon\Delta\gamma$ and the actual yaw rate $\gamma$ almost agrees with the target yaw rate $\gamma'$. The vehicle enters into a neutral-steer condition and the normal operation flag $F_{NS}$ is set.

After that, the absolute value $|\Delta\gamma|$ of the yaw rate deviation $\Delta\gamma$ becomes large in the positive direction. After $t_6$, the vehicle is shifted to an over-steer tendency with respect to the target yaw rate $\gamma'$ and the normal operation flag $F_{NS}$ is cleared. At the same time, the timer start flag $F_{TR}$ is set to start the threshold value determining timer. Further, the second threshold value $\epsilon\Delta S$ which is smaller than the first threshold value $\epsilon\Delta M$ is set as a judging threshold value $\epsilon\Delta$.

No brake signal is outputted until a time $t_7$, since the absolute value $|\Delta\gamma|$ of the yaw rate deviation $\Delta\gamma$ is smaller than the judging threshold value $\epsilon\Delta$. After a time $t_7$, brake signals are allowed to be outputted. In this case, the output mode of brake signal is Case 2 shown in FIG. 3 because of $\gamma>\epsilon$ (a positive sign and a left turn) and $\Delta\gamma>\epsilon\Delta\gamma$ (a positive sign and an over-steer tendency). In Case 2, brake is applied to the right front wheel $4_{fr}$ so as to correct the vehicle behavior by a moment produced in the arrow direction, thereby a spin phenomenon is prevented. In this state, even when the right front wheel $4_{fr}$ is locked and loses a side force due to an excessive braking on the left rear wheel $4_{fr}$, the vehicle still keeps an under-steer tendency and generates a yaw rate having the same direction (an arrow direction) as the nature of the control.

Further, at a time $t_8$ the absolute value $|\Delta\gamma|$ of the yaw rate deviation $\Delta\gamma$ becomes smaller than the judging threshold value $\epsilon\Delta$ and the vehicle enters into the noncontrol zone. After a time $t_9$, the actual yaw rate $\gamma$ almost agrees with the target yaw rate $\gamma'$ before the threshold value determining timer is counted out.

At a time $t_9$, the normal operation flag $F_{NS}$ is set and at the same time the under-steer flag $F_{US}$ is cleared. The threshold value determining timer is stopped to clear the timer start flag $F_{TR}$. Then, the first threshold value $\epsilon\Delta M$ is set as a judging threshold value $\epsilon\Delta$.

After a time $t_{10}$, the absolute value $|\Delta\gamma|$ of the yaw rate deviation $\Delta\gamma$ becomes Larger than the threshold value $\epsilon\Delta\gamma$ and the normal operation flag $F_{NS}$ is cleared. The vehicle is again shifted to an under-steer tendency and the under-steer flag $F_{US}$ is set.

Then, after a time $t_{11}$, the absolute value $|\Delta\gamma|$ of the yaw rate deviation $\Delta\gamma$ becomes smaller than the threshold value $\epsilon\Delta\gamma$ and the actual yaw rate $\gamma$ almost agrees with the target yaw rate $\gamma'$. The normal operation flag $F_{NS}$ is set. The under-steer flag $F_{US}$ remains to be set, however, this does not produce any problem because the vehicle generally experiences an under-steer tendency before it is shifted to an over-steer tendency.

Following a time $t_8$, since the absolute value $|\Delta\gamma|$ of the yaw rate deviation $\Delta\gamma$ becomes smaller than the judging threshold value $\epsilon\Delta$, the vehicle stays in the noncontrol zone and therefore no brake signal is outputted.

In the output judging section 19, since the second threshold value $\epsilon\Delta S$ which is smaller than the first threshold value $\epsilon\Delta M$ is employed as a judging threshold value $\epsilon\Delta$ during a specified time or until the control under an over-steer tendency is finished, the starting of the control at the converting point from the under-steer tendency to the over-steer tendency can be advanced. In FIG. 7, two-dots chain lines show a yaw rate or a yaw rate deviation according to the prior art. As well understood by these yaw rate or yaw rate deviation, the starting of the control at the converting point from an under-steer tendency to an over-steer tendency is $t_7'$ when the yaw rate deviation $\Delta\gamma$ becomes equal to $\epsilon\Delta M$. Hence, the difference between the actual yaw rate $\gamma$ and the target yaw rate $\gamma'$ becomes not so large after the vehicle is shifted from an under-steer tendency to an over-steer tendency. Further, according to the present invention, as clearly understood from FIG. 7, the actual yaw rate $\gamma$ can be converged on the target yaw rate $\gamma'$ earlier than in the prior art. As a result, the vehicle driver can enjoys a smoother, more natural and more docile vehicle behavior control. Further, since the noncontrol zone is established with a larger band width when the braking control by the rear wheel is applied and it is established with a smaller band width when the braking control by the front wheel is applied, the braking control by the rear wheel is restricted. Further, the return of the judging threshold value $\epsilon\Delta$ from the second threshold value $\epsilon\Delta S$ to the $\epsilon\Delta M$ is performed by the timer and the finishing signal of the control in an over-steer tendency. In this system, since the braking force applied to the rear wheel is restricted, the vehicle can be prevented from a slip when the rear wheel loses a side force due an excessive braking applied thereto on a road with a surface having low friction coefficient. Also, the vehicle driver is relieved of an anxiety due to an excessive turning around of the head of the vehicle. Further, since a most appropriate braking wheel is selected from among four wheels by judging the turning direction of the vehicle based on the actual yaw rate $\gamma$, by judging the running state based on the yaw rate $\gamma$ and the yaw rate deviation $\Delta\gamma$ and by judging whether the vehicle is in an under-steer tendency or in an over-steer tendency, spins or drift-outs during cornerings can be prevented. In general when a braking force is applied to the rear wheel while the vehicle is going into a spin, the spin tendency is strengthened. Also, when a braking force is applied to the front wheel while the vehicle is in a drift-out tendency, the drift-out tendency is fostered. Further, when a counter steering is given to the vehicle, there is a tendency that a braking force is applied to a wheel increasing a spin.

These tendencies or phenomena can be prevented by applying braking force to a most effective wheel. Further, some drivers often make use of the accelerator pedal when cornering. According to the present invention, since the braking force is corrected corresponding to the depression amount of the accelerator pedal, the driver can make a sharp turn with an over-steer tendency easily by depressing the accelerator pedal positively in the same manner as a vehicle not equipped with a braking force control apparatus.

Next, referring now to FIG. 10 through FIG. 13, these drawings show a second embodiment in which a mode selector switch is disposed at the front of the driver's seat so as enjoy a sport driving, i.e., when the mode selector switch is changed over to a sport mode, the target yaw rate is corrected to a large value and additionally the target braking force is corrected to a large value. Sections common to the first embodiment will be omitted from the following descriptions to avoid duplicate explanations.

The mode selector switch 26 is a change-over switch for selecting either a normal mode in which a normal braking force control is conducted or a sport mode in which the braking force control is alleviated according to a driver's requirement to make a vehicle turn without turning the steering wheel.

As shown in FIG. 10, the mode selector switch 26 is connected with an electronic control apparatus 25 which comprises a vehicle speed calculating section 11, a steering angle calculating section 12, a yaw rate gain calculating section 13, a target yaw rate calculating section 27, a yaw rate deviation calculating section 15, a turning amount correcting section 28, a target braking force calculating section 29, a braking wheel judging section 18, an output judging section 19 and a brake signal outputting section 20.

The target yaw rate calculating section 27 calculates a target yaw rate γ' based on an actual steering angle derived from the steering angle calculating section 12 and on a yaw rate gain Gγδf (0) derived from the yaw gain calculating section 13 according to the aforementioned formula (3) taking a response delay of the vehicle into consideration and this target yaw rate γ' is corrected, if necessary, with a yaw rate correction coefficient $K_{\gamma'cc}$ which will be described hereinafter according to a signal from the turning amount correcting section 28. The target yaw rate γ' is corrected according to the following formula.

$$\gamma' = K_{\gamma'cc} \cdot \gamma' \quad (10)$$

Further, in case where the mode selector switch 26 is changed over to the sport mode, the turning amount correcting section 28 outputs the yaw rate correction coefficient $K_{\gamma'cc}$ and a correction executing signal to the target yaw rate calculating section 27 based on a signal from the mode selector switch 26 and on a signal from the throttle opening angle sensor 8 so as to correct the target yaw rate γ' according to the formula (10). Further, the turning amount correcting section 28 outputs the front wheel brake pressure correction coefficient $K_{accf}$, the rear wheel brake pressure correction coefficient $K_{accr}$ and a correction executing signal to the target braking force calculating section 29 so as to correct the target brake pressures $BF2_f$ and $BF2_r$ according to the formulas (8) and (9).

On the other hand, in case where the mode selector switch 26 is changed over to the normal mode, the turning amount correcting section 28 outputs a signal toward the target yaw rate calculating section 27 so as to output the target yaw rate γ' calculated according to the formula (3) without making a correction to the target yaw rate γ' and further outputs a signal toward the target braking force calculating section 29 so as to output the target brake pressures $BF2_f$ and $BF2_r$ calculated according to the formulas (5) and (6) without correcting these target brake pressures $BF2_f$ and $BF2_r$.

Figure 13A:
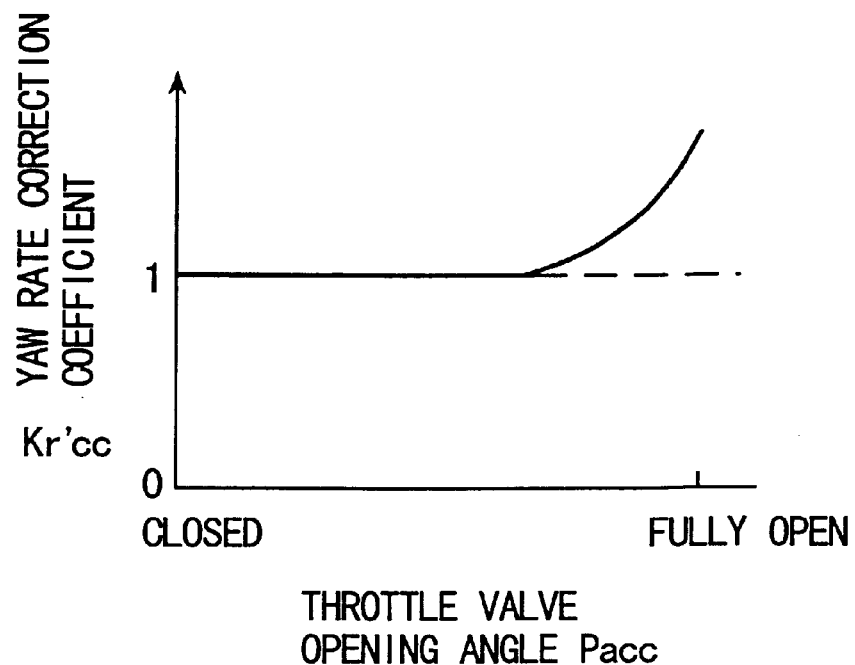
FIG. 13 is an explanatory view showing a characteristic of a yaw rate correction coefficient according to a second embodiment.
Figure 13B:
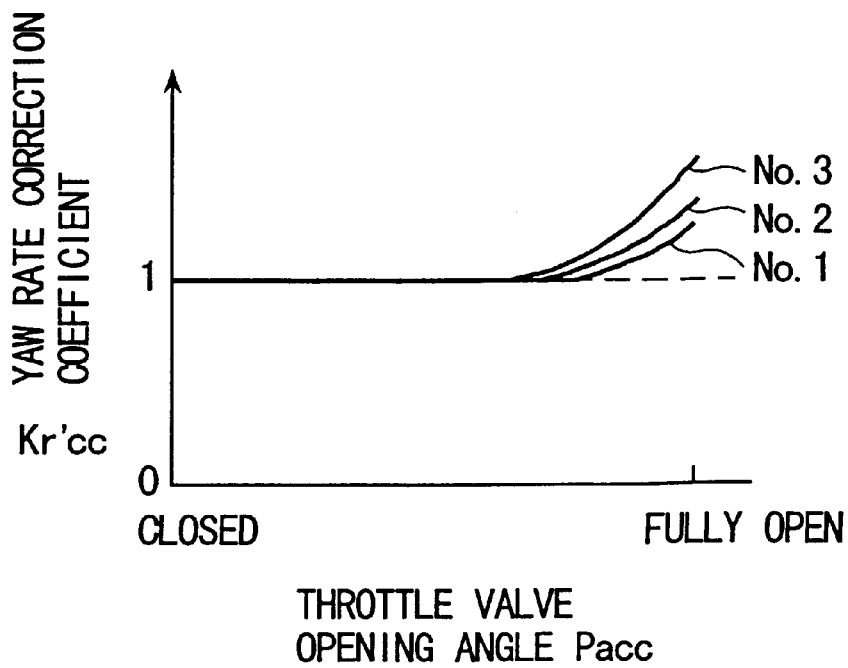

The yaw rate correction coefficient $K_{\gamma'cc}$, as shown in FIG. 13a, is set to 1 until the throttle valve opening angle $P_{acc}$ reaches a specified value, however, it is set to a value increasing as the throttle valve opening angle $P_{acc}$ becomes large. Consequently, the target yaw rate γ' calculated according to the formula (3) is outputted as it is before the throttle opening angle reaches the specified value but after the throttle valve opening angle has reached the specified value the target yaw rate γ' is corrected to a value getting large with an increase of the throttle opening angle $P_{acc}$. Namely, in the sport mode the target yaw rate γ' is corrected in the direction fostering a head turn of the vehicle as the throttle opening angle $P_{acc}$ becomes large (according to a degree of a driver's desire to turn the vehicle). Further, as shown in FIG. 13b, the yaw rate correction coefficient $K_{\gamma'cc}$ may be selected from a plurality of characteristics according to a driver's choice.

The target braking force calculating section 29 is a circuit for calculating the front wheel target brake pressure $BF2_f$ and the rear wheel target brake pressure $BF2_r$ according to the formulas (5) and (6). The calculated target brake pressures $BF2_f$ and $BF2_r$ are corrected with the front wheel brake pressure correction coefficient $K_{accf}$ and the rear wheel brake pressure correction coefficient $K_{accr}$ according to the formulas (8) and (9) and then outputted to the brake signal outputting section 20.

Figure 12:
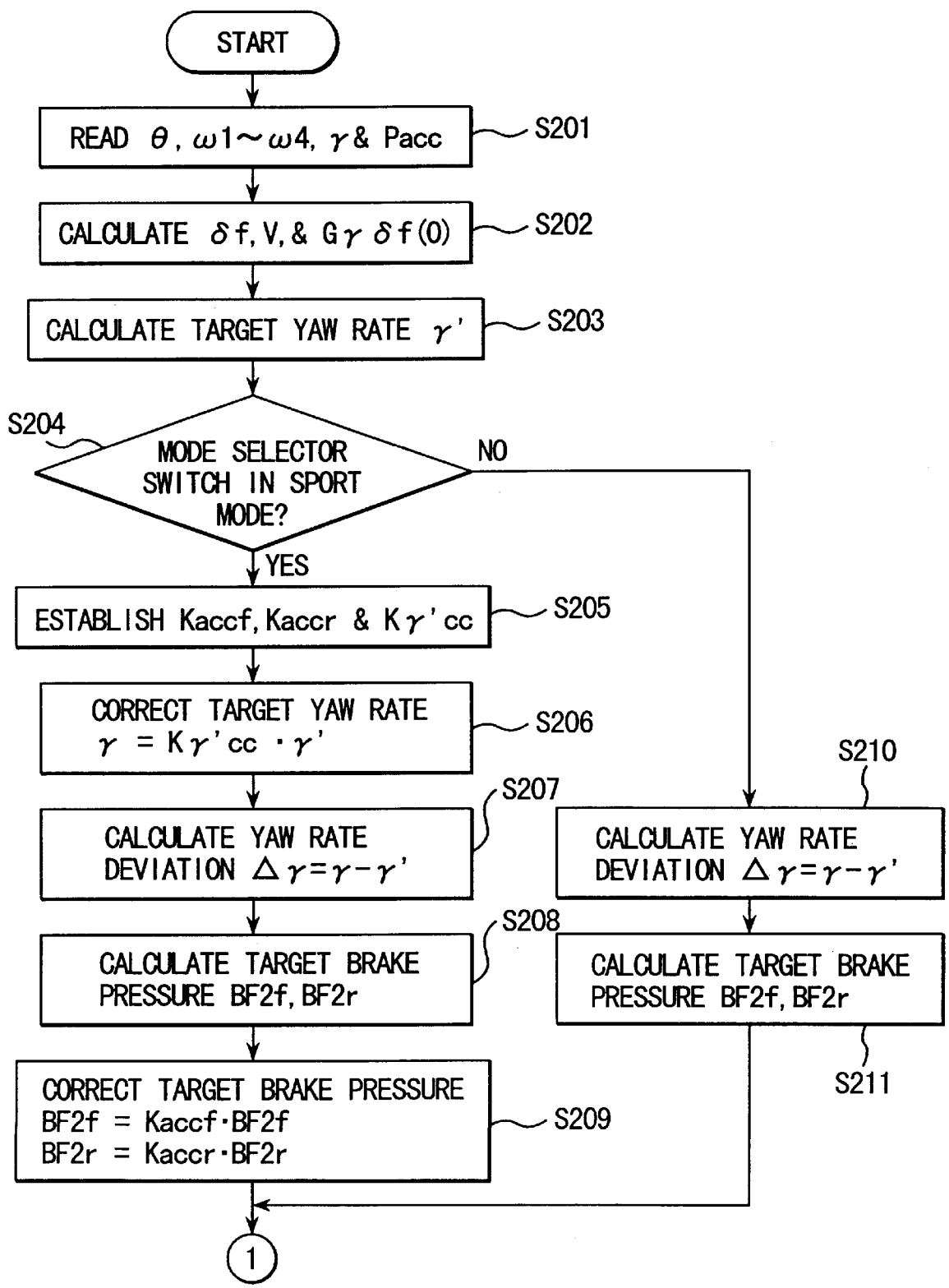
FIG. 12 is a flowchart of a braking force control according to a second embodiment.

Next, an operation of the braking force control according to the second embodiment of the present invention will be described with reference to a flowchart shown in FIG. 12 corresponding to the aforementioned flowchart in FIG. 4. The control program for the braking force control system is executed at a specified time interval (for example 10 millisecond) during running of the vehicle. When the program starts, at a step S201 a steering wheel angle θ is read from the steering wheel angle sensor 7, wheel speeds $\omega_1, \omega_2, \omega_3, \omega_4$ are read out from the wheel speed sensors $6_{fl}, 6_{fr}, 6_{rl}, 6_{rr}$, an actual yaw rate γ from the yaw rate sensor 9 and a throttle valve opening angle $P_{acc}$ from the throttle valve opening angle sensor 8, respectively and then the program goes to S202.

At S202 an actual steering angle $\delta_f$ is calculated from the steering wheel angle θ (δf=θ/N) in the steering angle calculating section 12 and a vehicle speed V is calculated from the wheel speeds $\omega_1, \omega_2, \omega_3, \omega_4$ in the vehicle speed detecting section 11. Further, a yaw rate gain $G_{\gamma\delta f}$ (0) is calculated according to the formula (1) in the yaw rate gain calculating section 13.

Then, the program goes to S203 where the target yaw rate calculating section 27 calculates a target yaw rate γ' according to the formula (3) and after that steps to S204. At S204, it is judged whether or not the mode selector switch 26 is changed to a sport mode.

If it is judged that the mode selector switch 26 is switched to the sport mode, the program goes to S205 in which the turning amount correcting section 28 establishes a front wheel brake pressure $K_{accf}$, a rear wheel brake pressure $K_{accr}$ and a yaw rate correction coefficient $K_{\gamma'cc}$. At the next step S206, the target yaw rate calculating section 27 corrects the target yaw rate γ' calculated at S203 according to the formula (10) and at S207 the yaw rate deviation calculating section 15 calculates a yaw rate deviation Δγ (=γ−γ') based on the target yaw rate γ obtained at S206 and the actual yaw rate γ' detected by the yaw rate sensor 9.

At S208, the target braking force calculating section 29 calculates a front wheel target brake pressure $BF2_f$ and a rear wheel target brake pressure $BF2_r$ according to the formulas (5) and (6) respectively and then at S209 corrects these calculated brake pressures $BF2_f$ and $BF2_r$ according to the formulas (8) and (9). After that, the program goes to S108 where the braking wheel is determined.

On the other hand, if it is judged at S204 that the mode selector switch is in a normal mode, the program goes to S210 where a yaw rate deviation $\Delta\gamma$ $(=\gamma-\gamma')$ is calculated and then at S211 a front wheel brake pressure $BF2_f$ and rear wheel brake pressure $BF2_r$ are calculated according to the formulas (5) and (6) respectively. After that, the program steps to S108 where the braking wheel is determined. The steps after S108 are the same as those described in the first embodiment.

Thus, according to the second embodiment of the present invention, in case where a normal mode is selected, the vehicle can be operated with a controlled neutral-steer tendency and in case where a sport mode is selected, the vehicle can make a turn with an over-steer tendency by the accelerator pedal operation in a similar way to a vehicle having no braking force control. Further, in this case the turning characteristic of the vehicle can be varied according to the depression amount of the accelerator pedal.

In the present invention, a throttle valve opening angle sensor is used in order to detect a driver's intention to make a turn, however alternatively an accelerator pedal sensor may be used for this purpose. Further, alternatively, a steering wheel sensor for detecting a rotational speed of the steering wheel can be used for a parameter to judge a driver's vehicle turning intention.

In summary, according to the present invention, when a driver intends to make a sharp turn by other operations than the steering wheel such as depressing the accelerator pedal, the target yaw rate is corrected to a large value and further the braking force to be applied to the front wheel is alleviated and the braking force to be applied to the rear wheel is strengthened, thereby a driver can control the vehicle turn arbitrarily by operating the steering wheel and the accelerator pedal.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A braking force control system of a vehicle, having a front wheel, a rear wheel, a front wheel cylinder for braking said front wheel, a rear wheel cylinder for braking said rear wheel, a brake drive apparatus for supplying and controlling brake pressure to said front wheel cylinder and said rear wheel cylinder, vehicle speed detecting means for detecting a vehicle speed, steering angle detecting means for detecting a steering angle, and yaw rate detecting means for detecting an actual yaw rate of said vehicle, comprising:

yaw rate gain calculating means for calculating a yaw rate gain based on said vehicle speed;

target yaw rate calculating means for calculating a target yaw rate based on said vehicle speed, said steering angle and said yaw rate gain;

yaw rate deviation calculating means for calculating a yaw rate deviation of said target yaw rate from said actual yaw rate;

turning requirement detecting means for detecting a driver's requirement to make a positive turn of said vehicle and for outputting a requirement magnitude signal representing a magnitude of said driver's requirement;

brake pressure correction coefficient generating means for generating a brake pressure correction coefficient corresponding to said requirement magnitude signal;

target braking force calculating means for calculating a target braking force based on said yaw rate deviation, said steering angle, said yaw rate gain, said vehicle speed and said actual yaw rate;

braking force correcting means for correcting said target braking force with said brake pressure correction coefficient such that said target braking force of said front wheel is corrected to a smaller value and said target braking force of said rear wheel is corrected to a larger value and for outputting a corrected target braking force;

braking wheel determining means for determining a braking wheel based on said actual yaw rate and said yaw rate deviation such that said rear wheel on a side of a turning center is selected as said braking wheel when said actual yaw rate differs from said yaw rate deviation in sign and such that said front wheel on an opposite side of a turning center is selected when said actual yaw rate agrees with said yaw rate deviation in sign;

output judging means for selectively determining a judging threshold value based on said yaw rate deviation, said actual yaw rate and said vehicle speed, for outputting a control signal so as to execute a braking force control when an absolute value of said yaw rate deviation is larger than said threshold value and for outputting a noncontrol signal so as to stop a braking force control when said absolute value of said yaw rate deviation is smaller than said threshold value; and brake signal outputting means responsive to said control signal for outputting a brake signal to said brake drive apparatus so as to apply said target braking force to said braking wheel and responsive to said noncontrol signal for stopping said brake signal to said brake drive apparatus.

2. The braking force control system according to claim 1, wherein said requirement magnitude signal is a signal representing a throttle valve opening angle.

3. The braking force control system according to claim 1, wherein said requirement magnitude signal is a signal representing a rotational speed of a steering wheel.

4. The braking force control system according to claim 1, wherein said brake pressure correction coefficient is selectable from a plurality of brake pressure correction coefficients.

5. The braking force control system according to claim 1, wherein said yaw rate correction coefficient is selectable from a plurality of yaw rate correction coefficients.

6. A braking force control system of a vehicle, having a front wheel, a rear wheel, a front wheel cylinder for braking said front wheel, a rear wheel cylinder for braking said rear wheel, a brake drive apparatus for supplying and controlling brake pressure to said front wheel cylinder and said rear wheel cylinder, vehicle speed detecting means for detecting a vehicle speed, and steering angle detecting means for detecting a steering angle, comprising:

a mode selector switch for selecting either a sport mode or a normal mode;

yaw rate detecting means for detecting an actual yaw rate of said vehicle;

yaw rate gain calculating means for calculating a yaw rate gain based on said vehicle speed;

turning requirement detecting means for detecting a driver's requirement to make a positive turn of said vehicle and for outputting a requirement magnitude signal representing a magnitude of said driver's requirement;

yaw rate correction coefficient generating means for generating a yaw rate correction coefficient corresponding to said requirement magnitude signal;

target yaw rate calculating means for calculating a target yaw rate based on said vehicle speed, said steering angle and said yaw rate gain;

target yaw rate correcting means for correcting said target yaw rate with said yaw rate correction coefficient such that said target yaw rate increases with an increase of said requirement magnitude signal when said mode selector switch is changed over to said sport mode and for passing said target yaw rate without correcting said target yaw rate when said mode selector switch is changed over to said normal mode;

yaw rate deviation calculating means for calculating a yaw rate deviation of said target yaw rate output from said target yaw rate correcting means from said actual yaw rate;

brake pressure correction coefficient generating means for generating a brake pressure correction coefficient corresponding to said requirement magnitude signal;

target braking force calculating means for calculating a target braking force based on said yaw rate deviation, said steering angle, said yaw rate gain, said vehicle speed and said actual yaw rate;

braking force correcting means for correcting said target braking force with said brake pressure correction coefficient such that said target braking force of said front wheel is corrected to a smaller value and said target braking force of said rear wheel is corrected to a larger value when said mode selector switch is changed over to said sport mode and for passing said target braking force without correcting said target braking force when said mode selector switch is changed over to said normal mode;

braking wheel determining means for determining a braking wheel based on said actual yaw rate and said yaw rate deviation such that said rear wheel on a side of a turning center is selected as said braking wheel when said actual yaw rate differs from said yaw rate deviation in sign and such that said front wheel on an opposite side of a turning center is selected when said actual yaw rate agrees with said yaw rate deviation in sign;

output judging means for selectively determining a judging threshold value based on said yaw rate deviation, said actual yaw rate and said vehicle speed, for outputting a control signal so as to execute a braking force control when an absolute value of said yaw rate deviation is larger than said threshold value and for outputting a noncontrol signal so as to stop a braking force control when said absolute value of said yaw rate deviation is smaller than said threshold value; and brake signal outputting means responsive to said control signal for outputting a brake signal to said brake drive apparatus so as to apply said target braking force to said braking wheel and responsive to said noncontrol signal for stopping said brake signal to said brake drive apparatus.

7. The braking force control system according to claim 6, wherein said requirement magnitude signal is a signal representing a throttle opening angle.

8. The braking force control system according to claim 6, wherein said requirement magnitude signal is a signal representing a rotational speed of a steering wheel.

9. The braking force control system according to claims 8, wherein said brake pressure correction coefficient is selectable from a plurality of brake pressure correction coefficients.

10. The braking force control system according to claim 6, wherein said yaw rate correction coefficient is selectable from a plurality of yaw rate correction coefficients.

11. A braking force control method of a vehicle, having a front wheel, a rear wheel, a front wheel cylinder for braking said front wheel, a rear wheel cylinder for braking said rear wheel, a brake drive apparatus for supplying and controlling brake pressure to said front wheel cylinder and said rear wheel cylinder, vehicle speed detecting means for detecting a vehicle speed, and steering angle detecting means for detecting a steering angle, comprising the steps of:

detecting an actual yaw rate of said vehicle;

calculating a yaw rate gain based on said vehicle speed;

calculating a target yaw rate based on said vehicle speed, said steering angle and said yaw rate gain;

calculating a yaw rate deviation of said target yaw rate from said actual yaw rate;

detecting a driver's requirement to make a positive turn of said vehicle and for outputting a requirement magnitude signal representing a magnitude of said driver's requirement;

generating a brake pressure correction coefficient corresponding to said requirement magnitude signal;

calculating a target braking force based on said yaw rate deviation, said steering angle, said yaw rate gain, said vehicle speed and said actual yaw rate;

correcting said target braking force with said brake pressure correction coefficient such that said target braking force of said front wheel is corrected to a smaller value and said target braking force of said rear wheel is corrected to a larger value and for outputting a corrected target braking force;

determining a braking wheel based on said actual yaw rate and said yaw rate deviation such that said rear wheel on a side of a turning center is selected as said braking wheel when said actual yaw rate differs from said yaw rate deviation in sign and such that said front wheel on an opposite side of a turning center is selected when said actual yaw rate agrees with said yaw rate deviation in sign;

determining selectively a judging threshold value based on said yaw rate deviation, said actual yaw rate and said vehicle speed, outputting a control signal so as to execute a braking force control when an absolute value of said yaw rate deviation is larger than said threshold value and outputting a noncontrol signal so as to stop a braking force control when said absolute value of said yaw rate deviation is smaller than said threshold value; and outputting a brake signal to said brake drive apparatus so as to apply said target braking force to said braking wheel and stopping said brake signal to said brake drive apparatus.

12. A braking force control method of a vehicle, having a front wheel, a rear wheel, a front wheel cylinder for braking said front wheel, a rear wheel cylinder for braking said rear wheel, a brake drive apparatus for supplying and controlling brake pressure to said front wheel cylinder and said rear wheel cylinder, vehicle speed detecting means for detecting a vehicle speed, and steering angle detecting means for detecting a steering angle, comprising the steps of:

selecting either a sport mode or a normal mode;

detecting an actual yaw rate of said vehicle;

calculating a yaw rate gain based on said vehicle speed;

detecting a driver's requirement to make a positive turn of said vehicle and for outputting a requirement magnitude signal representing a magnitude of said driver's requirement;

generating a yaw rate correction coefficient corresponding to said requirement magnitude signal;

calculating a target yaw rate based on said vehicle speed, said steering angle and said yaw rate gain;

correcting said target yaw rate with said yaw rate correction coefficient such that said target yaw rate increases with an increase of said requirement magnitude signal when said mode selector switch is changed over to said sport mode and passing said target yaw rate without correcting said target yaw rate when said mode selector switch is changed over to said normal mode;

calculating a yaw rate deviation of said target yaw rate from said actual yaw rate;

generating a brake pressure correction coefficient corresponding to said requirement magnitude signal;

calculating a target braking force based on said yaw rate deviation, said steering angle, said yaw rate gain, said vehicle speed and said actual yaw rate;

correcting said target braking force with said brake pressure correction coefficient such that said target braking force of said front wheel is corrected to a smaller value and said target braking force of said rear wheel is corrected to a larger value when said mode selector switch is changed over to said sport mode and for passing said target braking force without correcting said target braking force when said mode selector switch is changed over to said normal mode;

determining a braking wheel based on said actual yaw rate and said yaw rate deviation such that said rear wheel on a side of a turning center is selected as said braking wheel when said actual yaw rate differs from said yaw rate deviation in sign and such that said front wheel on an opposite side of a turning center is selected when said actual yaw rate agrees with said yaw rate deviation in sign;

determining selectively a judging threshold value based on said yaw rate deviation, said actual yaw rate and said vehicle speed, outputting a control signal so as to execute a braking force control when an absolute value of said yaw rate deviation is larger than said threshold value and outputting a noncontrol signal so as to stop a braking force control when said absolute value of said yaw rate deviation is smaller than said threshold value; and outputting a brake signal to said brake drive apparatus so as to apply said target braking force to said braking wheel and stopping said brake signal to said brake drive apparatus.

13. A braking control system for a vehicle having front and rear wheels, comprising:

a yaw rate detector for detecting an actual yaw rate of the vehicle;

detecting means for detecting running conditions of the vehicle;

target yaw rate calculating means for calculating a target yaw rate based on said vehicle running conditions;

target braking force calculating means for calculating target braking forces for said front and rear wheels so as to accord said actual yaw rate with said target yaw rate;

turning adjustment detecting means for adjusting operation of the braking control system in response to an adjustment requirement by a driver, the turning adjustment detecting means producing an adjustment signal in response to an input by the driver;

turning amount correcting means for correcting at least one of said target yaw rate and said target braking forces in response to the adjustment signal; and a brake drive apparatus provided to control brake pressure to be applied to each wheel cylinder depending on said target braking forces.

14. The braking control system according to claim 13, further comprising:

a mode selector switch provided to select either a first mode to execute a braking control in accordance with the correction performed by said turning amount correcting means or a second mode to execute a braking control without the correction performed by said turning amount correcting means.

15. The braking control system according to claim 14, wherein said turning amount correcting means is adapted to correct both said target braking forces and said target yaw rate when said first mode is selected.

16. The braking control system according to claim 13, wherein said turning amount correcting means is adapted to correct a target braking force for a front wheel to decrease and to correct a target braking force for a rear wheel to increase.

17. The braking control system according to claim 16, wherein said turning adjustment detecting means is adapted to produce the adjustment signal based on a throttle valve opening degree.

18. The braking control system according to claims 17, wherein the magnitude of correction of said target braking forces for said front and rear wheels is changed depending on said throttle valve opening degree.

* * * * *